US012777501B2

(12) United States Patent
Khoshkholgh Dashtaki et al.

(10) Patent No.: US 12,777,501 B2
(45) Date of Patent: Oct. 27, 2026

(54) CONTROL CHANNEL MONITORING IN A WIRELESS NETWORK

(71) Applicant: Comcast Cable Communications, LLC, Philadelphia, PA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 274 days.

(21) Appl. No.: 18/503,820

(22) Filed: Nov. 7, 2023

(65) Prior Publication Data

US 2024/0155643 A1 May 9, 2024

Related U.S. Application Data

(60) Provisional application No. 63/423,102, filed on Nov. 7, 2022.

(51) Int. Cl.

*H04W 72/232* (2023.01)
*H04L 1/1829* (2023.01)
*H04W 76/28* (2018.01)
*H04L 1/1812* (2023.01)

(52) U.S. Cl.

CPC ......... *H04W 72/232* (2023.01); *H04L 1/1854* (2013.01); *H04W 76/28* (2018.02); *H04L 1/1812* (2013.01)

(58) Field of Classification Search

None

See application file for complete search history.

(56) References Cited

U.S. PATENT DOCUMENTS

| | | | | |
|---|---|---|---|---|
| 11,412,568 | B2 | 8/2022 | Babaei et al. | |
| 2020/0396684 | A1* | 12/2020 | Lin | H04W 52/0229 |
| 2021/0058955 | A1* | 2/2021 | Nam | H04W 72/20 |
| 2021/0307108 | A1 | 9/2021 | Babaei | |
| 2022/0240284 | A1* | 7/2022 | Zhou | H04W 52/0225 |
| 2022/0311558 | A1* | 9/2022 | Tsai | H04L 1/1614 |
| 2022/0400516 | A1 | 12/2022 | Zhou et al. | |
| 2023/0048959 | A1* | 2/2023 | Hu | H04L 1/1883 |

(Continued)

FOREIGN PATENT DOCUMENTS

WO 2021253412 A1 12/2021

OTHER PUBLICATIONS

R1-2205393 3GPP TSG RAN WG1 Meeting #109-e, e-Meeting, May 9-20, 2022, Source: Moderator, Title: Preparation Phase Summary of Maintenance on PDCCH Monitoring Adaptation.

(Continued)

*Primary Examiner* — Clemence S Han

(74) *Attorney, Agent, or Firm* — Banner & Witcoff, Ltd.

(57) ABSTRACT

One or more wireless devices may communicate with a base station in a wireless network, such as a terrestrial network or a non-terrestrial network. The one or more wireless devices may resume control channel monitoring after a timing gap from an uplink signal transmission. One or more configuration parameters, such as radio resource control configuration parameters, may configure the one or more wireless devices to determine when and/or whether to resume the control channel monitoring after sending an uplink signal.

19 Claims, 25 Drawing Sheets

(56) References Cited

U.S. PATENT DOCUMENTS

| | | | | |
|---|---|---|---|---|
| 2023/0119893 A1* | 4/2023 | Li | H04W 24/08 | 370/329 |
| 2023/0131188 A1* | 4/2023 | Hu | H04W 74/0833 | 370/329 |
| 2023/0141378 A1* | 5/2023 | Lai | H04L 5/001 | 370/329 |
| 2023/0209465 A1* | 6/2023 | Zhou | H04W 72/232 | 370/311 |
| 2023/0371037 A1* | 11/2023 | Agiwal | H04L 5/0048 | |
| 2024/0073927 A1* | 2/2024 | Chen | H04L 5/0053 | |
| 2024/0349299 A1* | 10/2024 | Lee | H04W 76/28 | |
| 2025/0126622 A1* | 4/2025 | Ma | H04L 5/0053 | |

OTHER PUBLICATIONS

Mar. 27, 2024—EP Search Report—EP Application No. 23208285.9.

3GPP TS 38.211 V17.3.0 (Sep. 2022), 3rd Generation Partnership Project; Technical Specification Group Radio Access Network; NR; Physical channels and modulation (Release 17).

3GPP TS 38.212 V17.3.0 (Sep. 2022), Technical Specification, 3rd Generation Partnership Project; Technical Specification Group Radio Access Network; NR; Multiplexing and channel coding (Release 17).

3GPP TS 38.213 V17.3.0 (Sep. 2022), Technical Specification, 3rd Generation Partnership Project; Technical Specification Group Radio Access Network; NR; Physical layer procedures for control (Release 17).

3GPP TS 38.214 V17.3.0 (Sep. 2022), Technical Specification, 3rd Generation Partnership Project; Technical Specification Group Radio Access Network; NR; Physical layer procedures for data (Release 17).

3GPP TS 38.300 V17.1.0 (Jun. 2022), 3rd Generation Partnership Project; Technical Specification Group Radio Access Network; NR; NR and NG-RAN Overall Description; Stage 2 (Release 17).

3GPP TS 38.314 V17.0.0 (Mar. 2022), 3rd Generation Partnership Project; Technical Specification Group Radio Access Network; NR; Layer 2 Measurements; (Release 17).

3GPP TS 38.321 V17.2.0 (Sep. 2022), 3rd Generation Partnership Project; Technical Specification Group Radio Access Network; NR; Medium Access Control (MAC) protocol specification (Release 17).

3GPP TS 38.322 V17.0.0 (Mar. 2022), 3rd Generation Partnership Project; Technical Specification Group Radio Access Network; NR; Radio Link Control (RLC) protocol specification; (Release 17).

3GPP TS 38.331 V17.1.0 (Jun. 2022), 3rd Generation Partnership Project; Technical Specification Group Radio Access Network; NR; Radio Resource Control (RRC) protocol specification (Release 17).

May 8, 2026—European Office Action—EP App. 23208285.9.

* cited by examiner

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

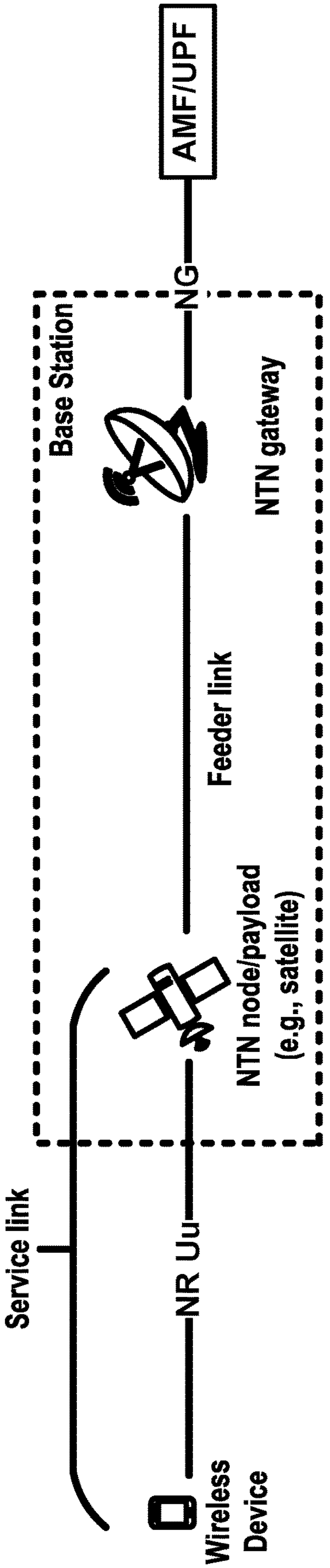

FIG. 18A

Types of NTN platforms/nodes/payloads

| NTN Platforms | Altitude range | Orbit | Typical beam footprint size |
|---|---|---|---|
| LEO satellite | 300 – 1500 km | Circular around the earth | 100 – 1000 km |
| MEO satellite | 7000 – 25000 km | | 100 – 1000 km |
| GEO satellite | 35,786 km | Notional station keeping position fixed in terms of elevation/azimuth with respect to a given earth point | 200 – 3500 km |
| UAS platform | 8-50 km (20km for HAPS) | | 5 – 200 km |
| HEO platform | 400 – 50000km | Elliptical around the earth | 200 – 3500 km |

FIG. 18B

| Class of Orbit | Elevation angle (degrees) | | |
|---|---|---|---|
| Altitude (km) | 0 | 10 | 90 |
| LEO satellite | Propagation delay – satellite to UE (ms) | | |
| 800 | 11.0 | 7.9 | 2.7 |
| 1400 | 14.8 | 11.6 | 4.7 |
| MEO satellite | Propagation delay – satellite to UE (ms) | | |
| 8000 | 43.0 | 39.4 | 26.7 |
| GEO satellite | Propagation delay – satellite to UE (ms) | | |
| 35,786 | 138.9 | 135.3 | 119.3 |

CONTROL CHANNEL MONITORING IN A WIRELESS NETWORK

CROSS-REFERENCE TO RELATED APPLICATIONS

This application claims the benefit of U.S. Provisional Application No. 63/423,102, filed on Nov. 7, 2022. The above referenced application is hereby incorporated by reference in its entirety.

BACKGROUND

In a wireless communication system, wireless devices communicate with a base station. A control channel is used to send to the wireless devices control information such as scheduling commands, scheduling grants, and power control commands.

SUMMARY

The following summary presents a simplified summary of certain features. The summary is not an extensive overview and is not intended to identify key or critical elements.

One or more wireless devices may communicate with a base station in a network, such as a terrestrial network or a non-terrestrial network. A control channel may be configured to carry control information, which may comprise downlink scheduling commands, uplink scheduling grants, and/or uplink power control commands. The one or more wireless devices may be configured to monitor the control channel periodically. In at least some networks, such as in non-terrestrial networks, a long round trip transmission delay may occur such that a wireless device may unnecessarily resume the control channel monitoring after sending an uplink signal, which may increase power consumption by the wireless device. As described herein, a wireless device may resume the control channel monitoring after a timing gap from an uplink signal transmission. One or more configuration parameters, such as radio resource control configuration parameters, may configure the wireless device to determine whether to resume the control channel monitoring after sending an uplink signal, which may lead to advantages such as reduced power consumption and/or improved performance.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 17 shows examples of various downlink control information (DCI) formats.

FIG. 18A shows an example of a non-terrestrial network.

FIG. 18B shows an example of different types of NTN platforms.

DETAILED DESCRIPTION

Figure 1A:
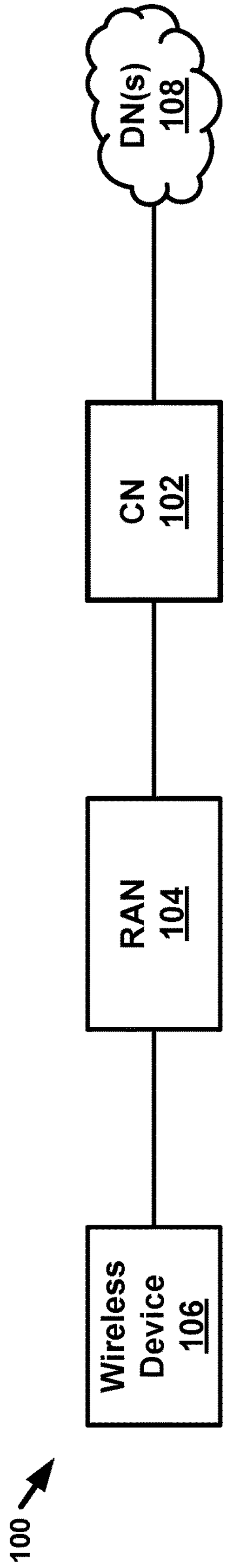
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/ configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
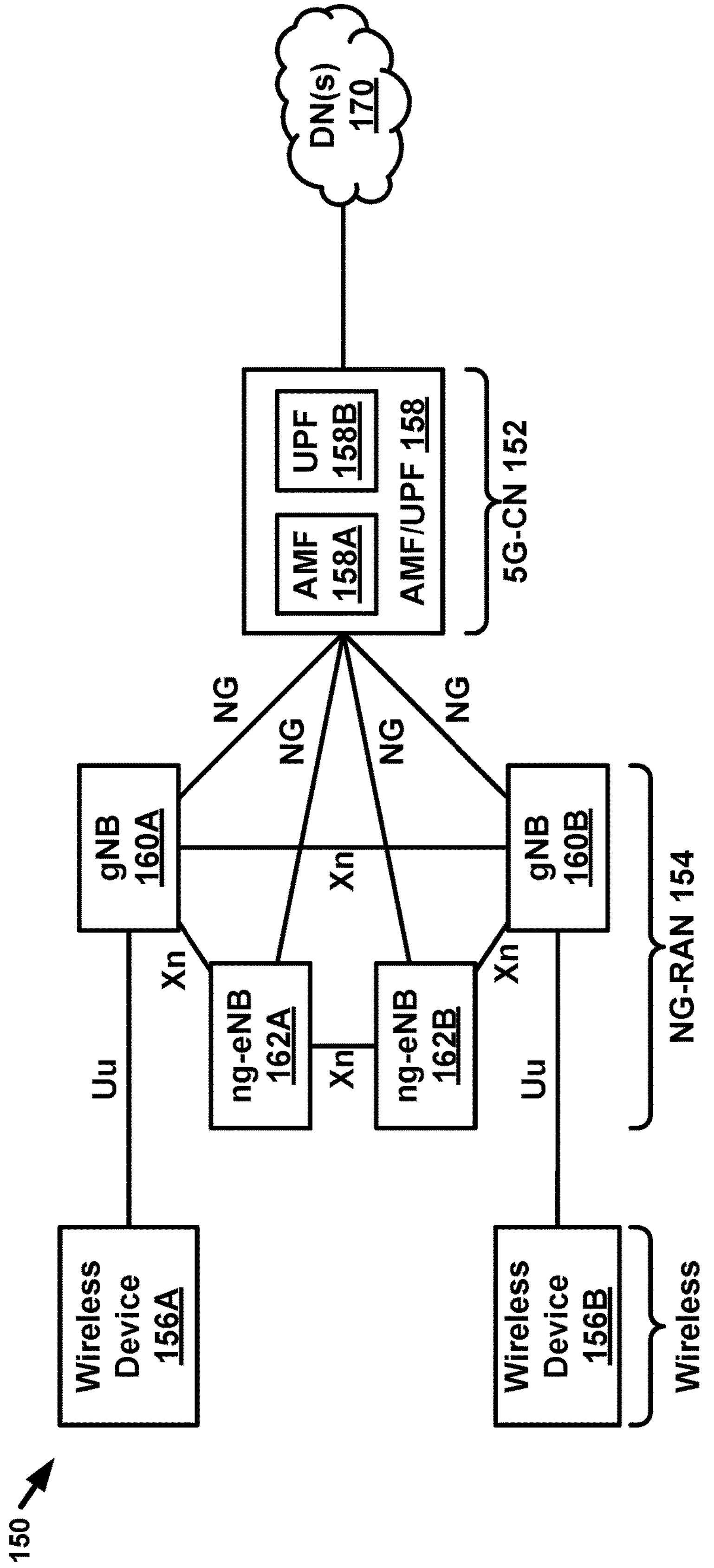

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s)

156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise a terrestrial network (e.g., a LTE network, a 5G network, a 6G network), a non-terrestrial network (e.g., a satellite network), and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
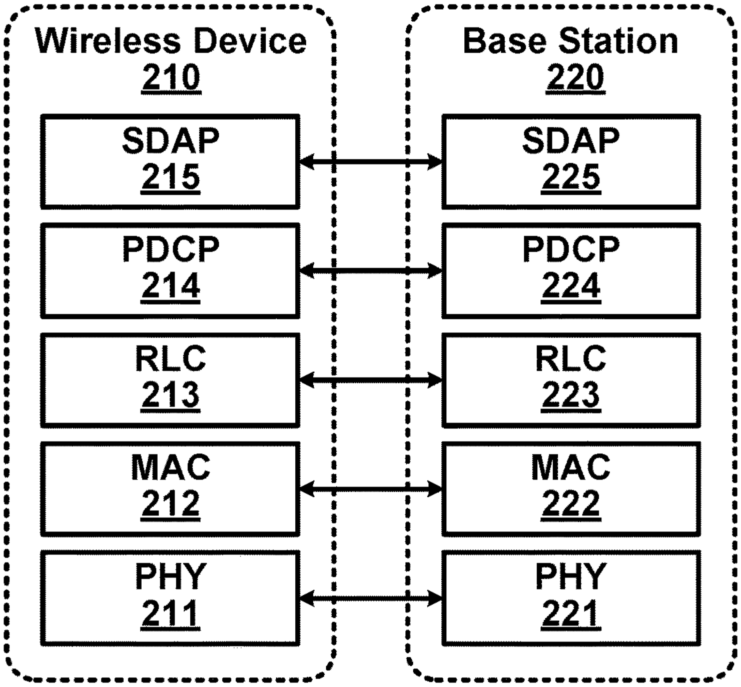
FIG. 2A shows an example user plane.
Figure 2B:
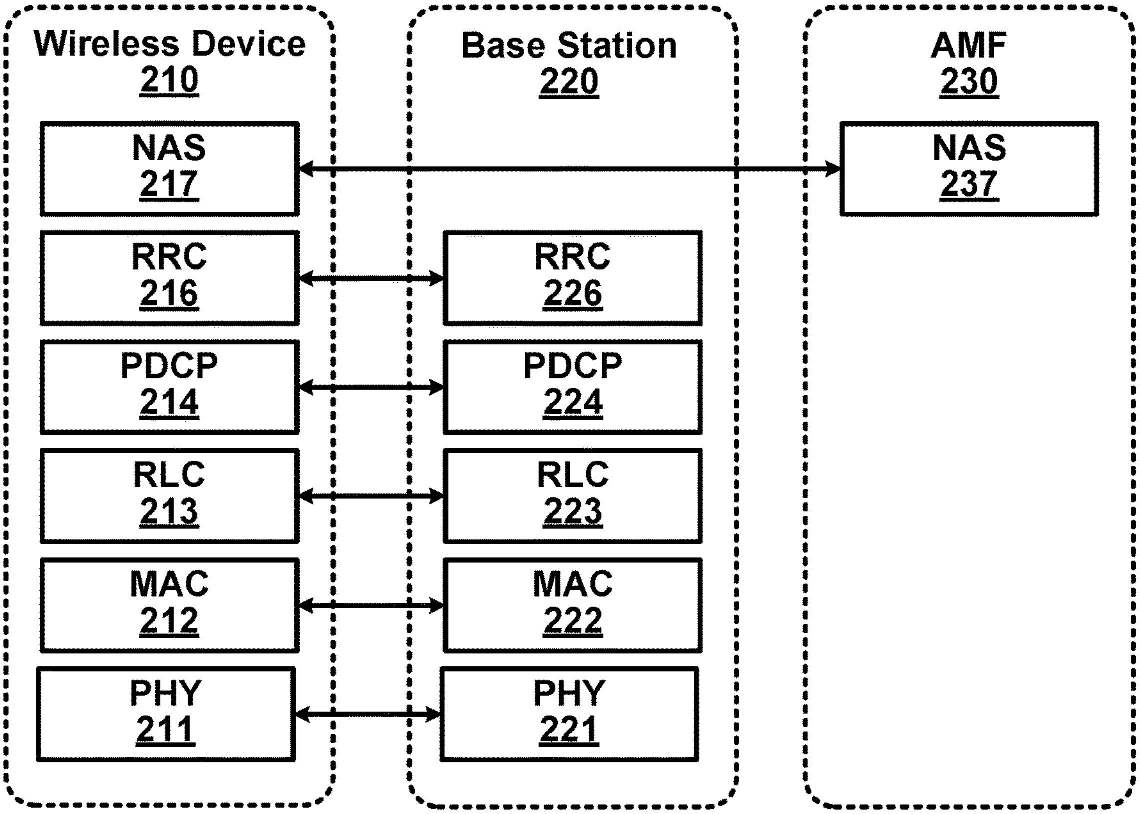
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG.

2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
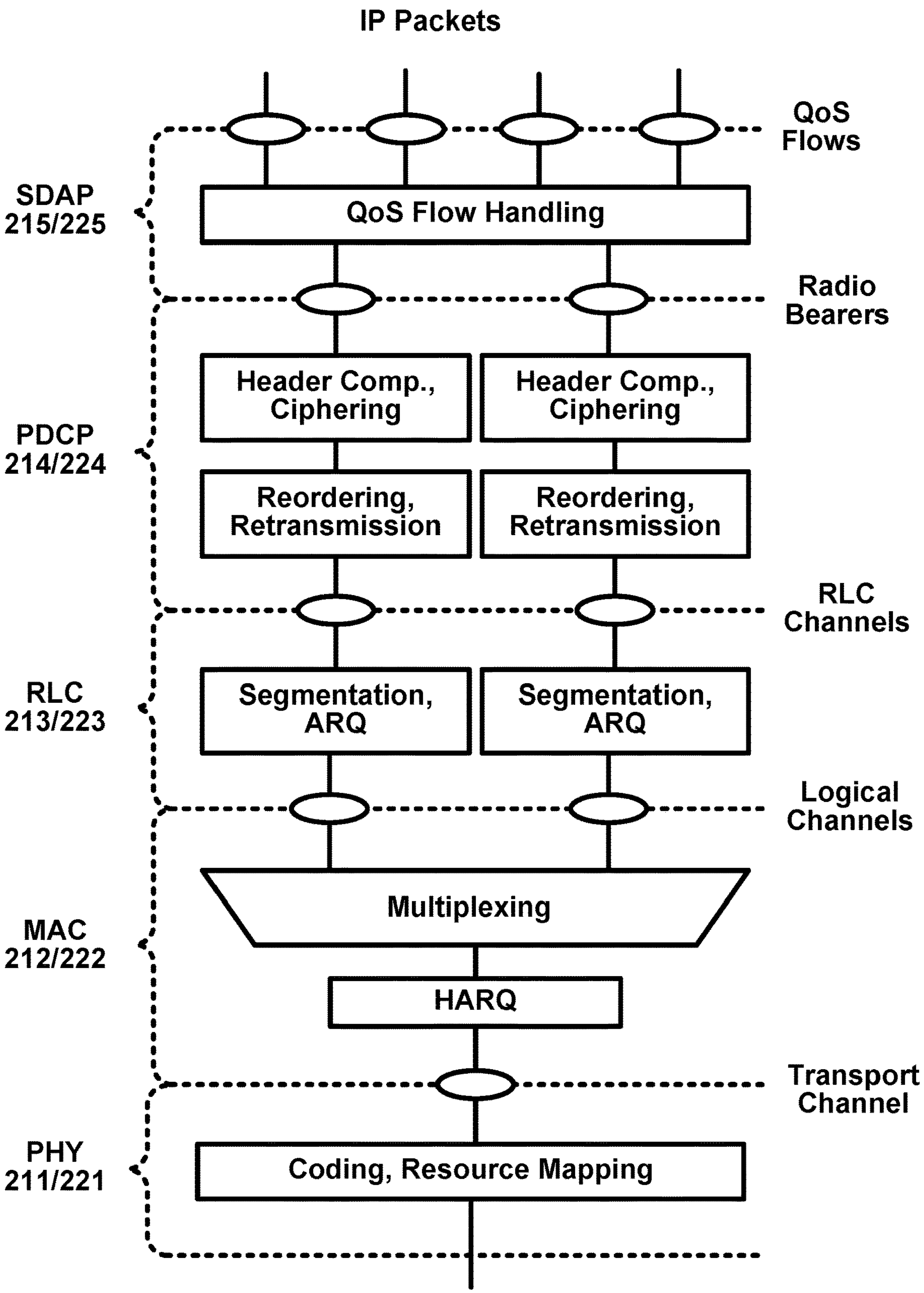
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity example/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
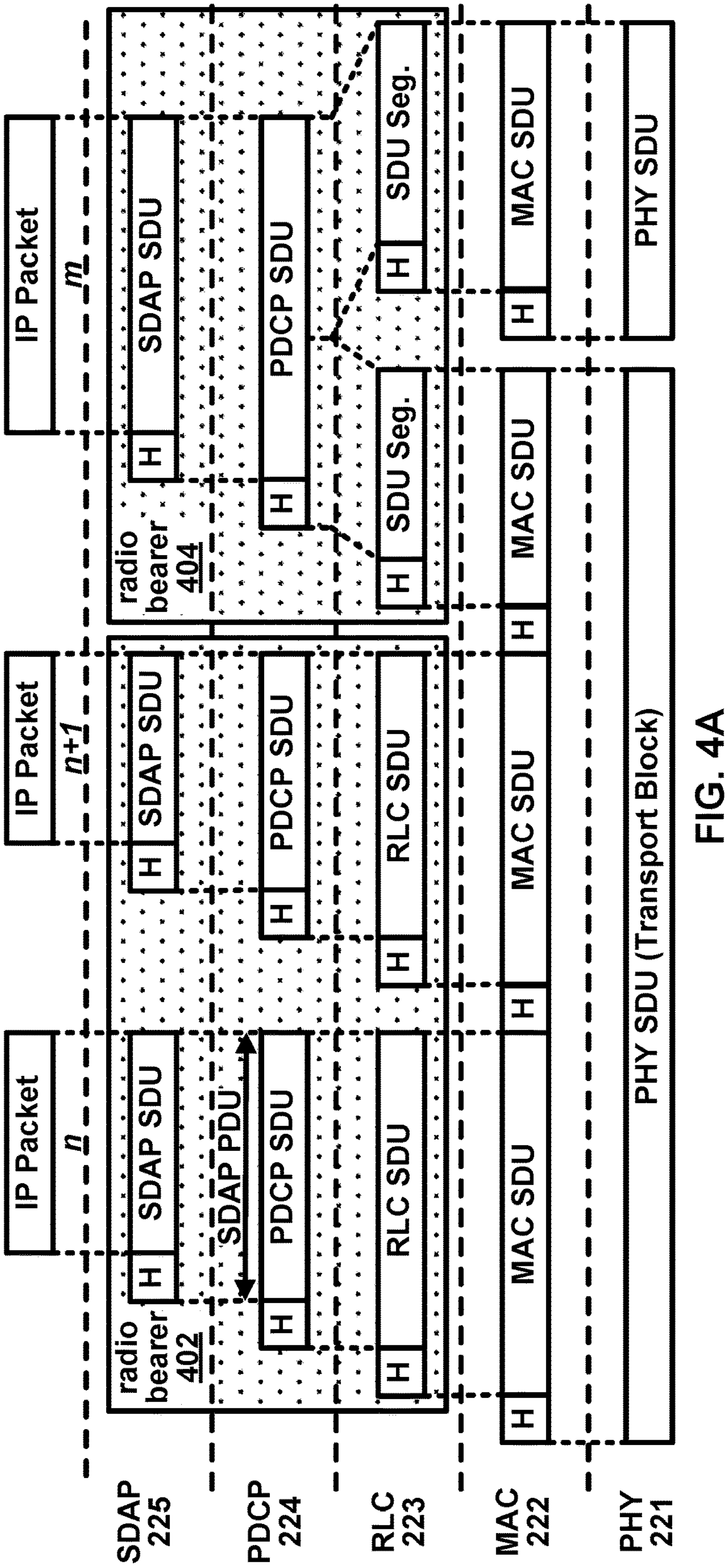
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
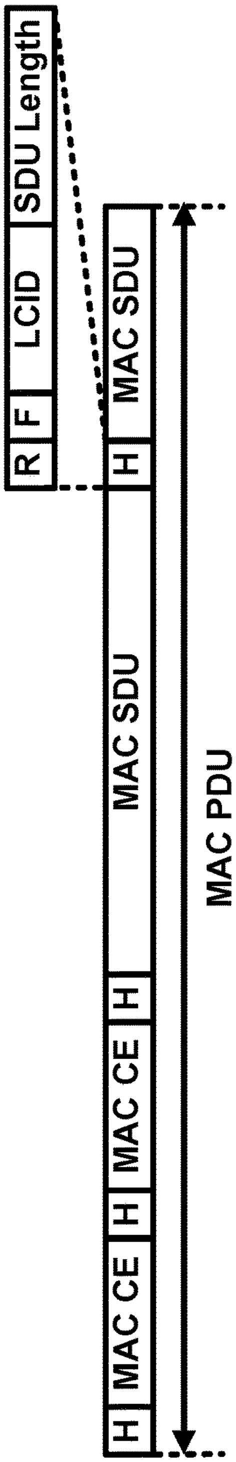
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
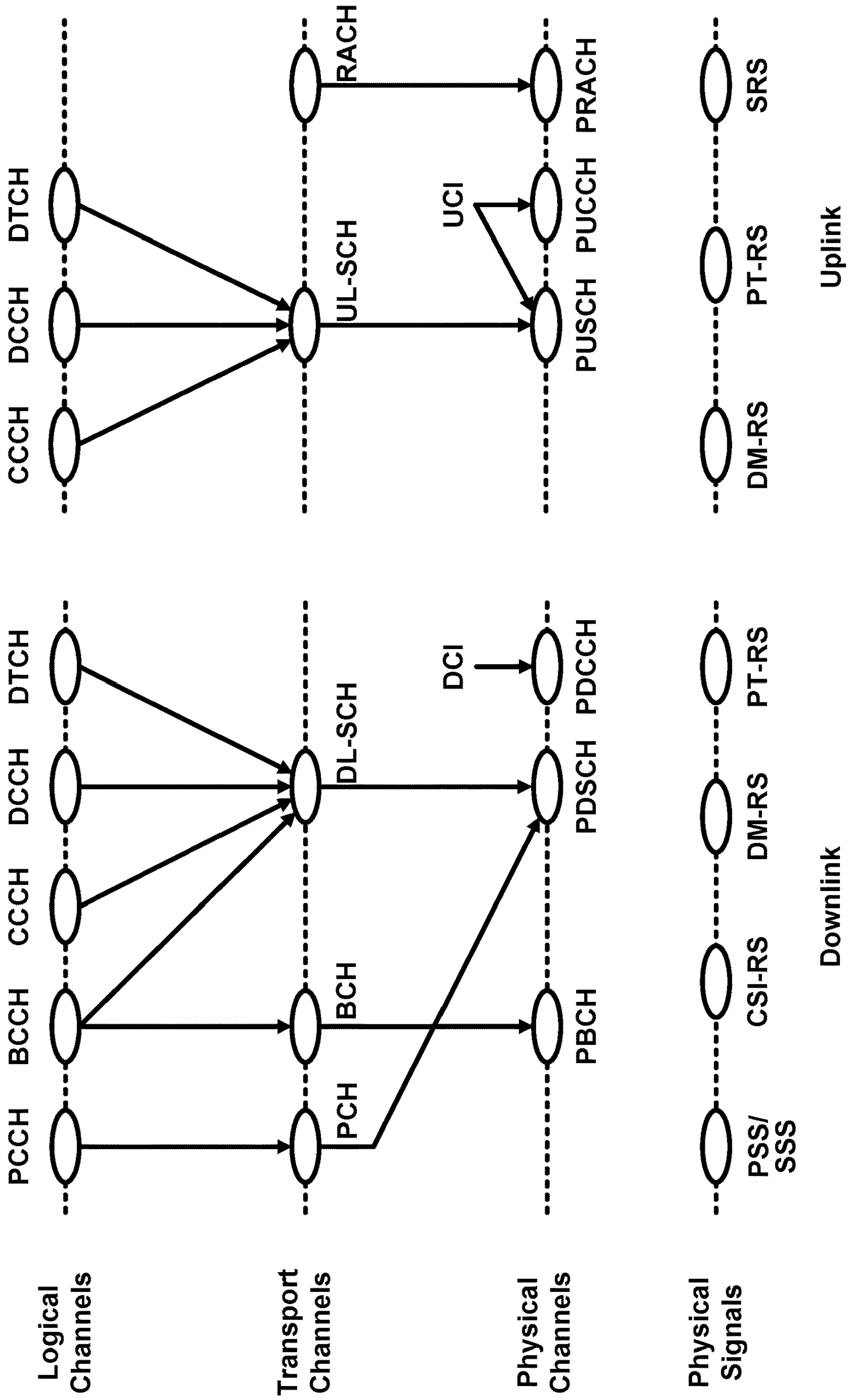
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
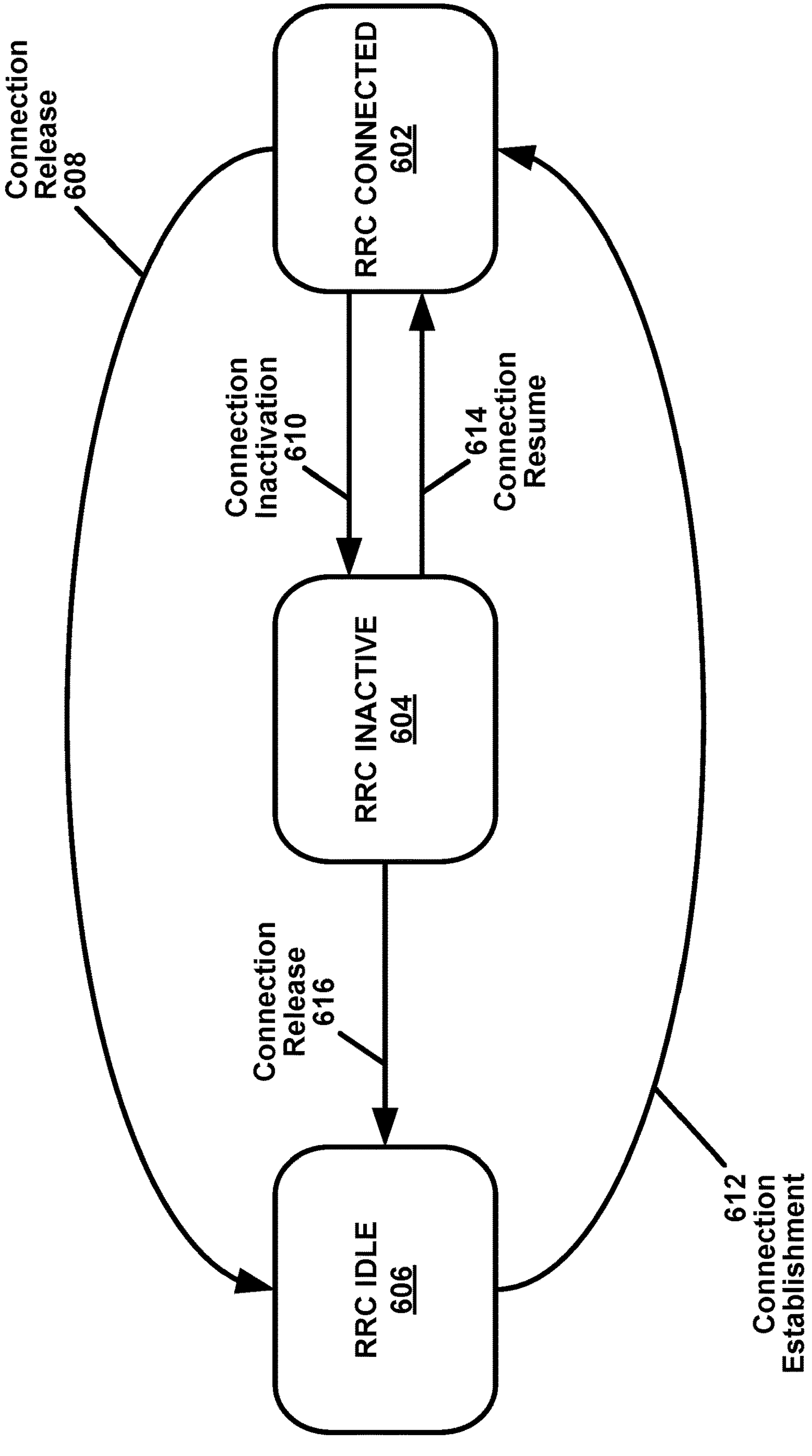
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by a RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
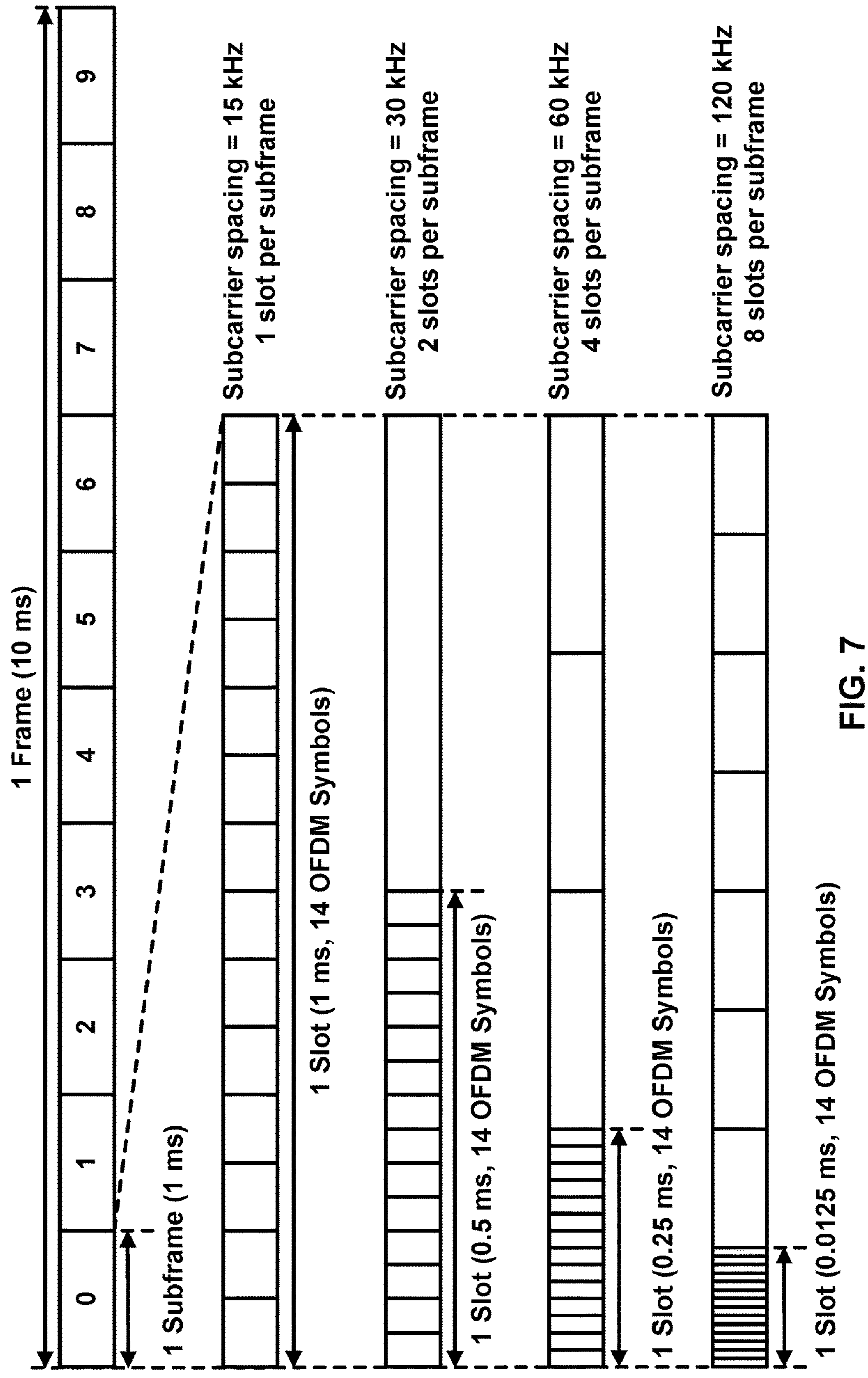
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
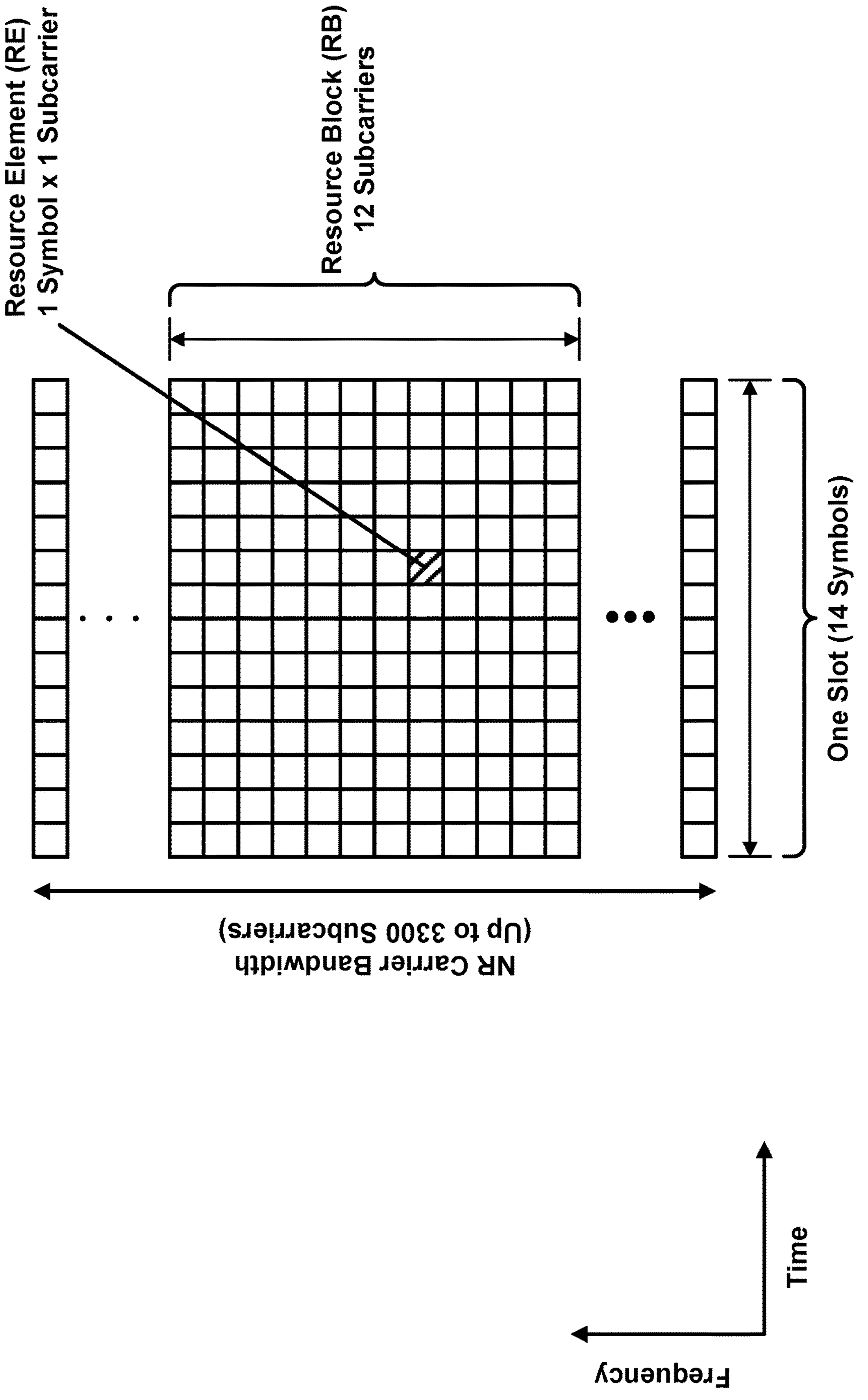
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
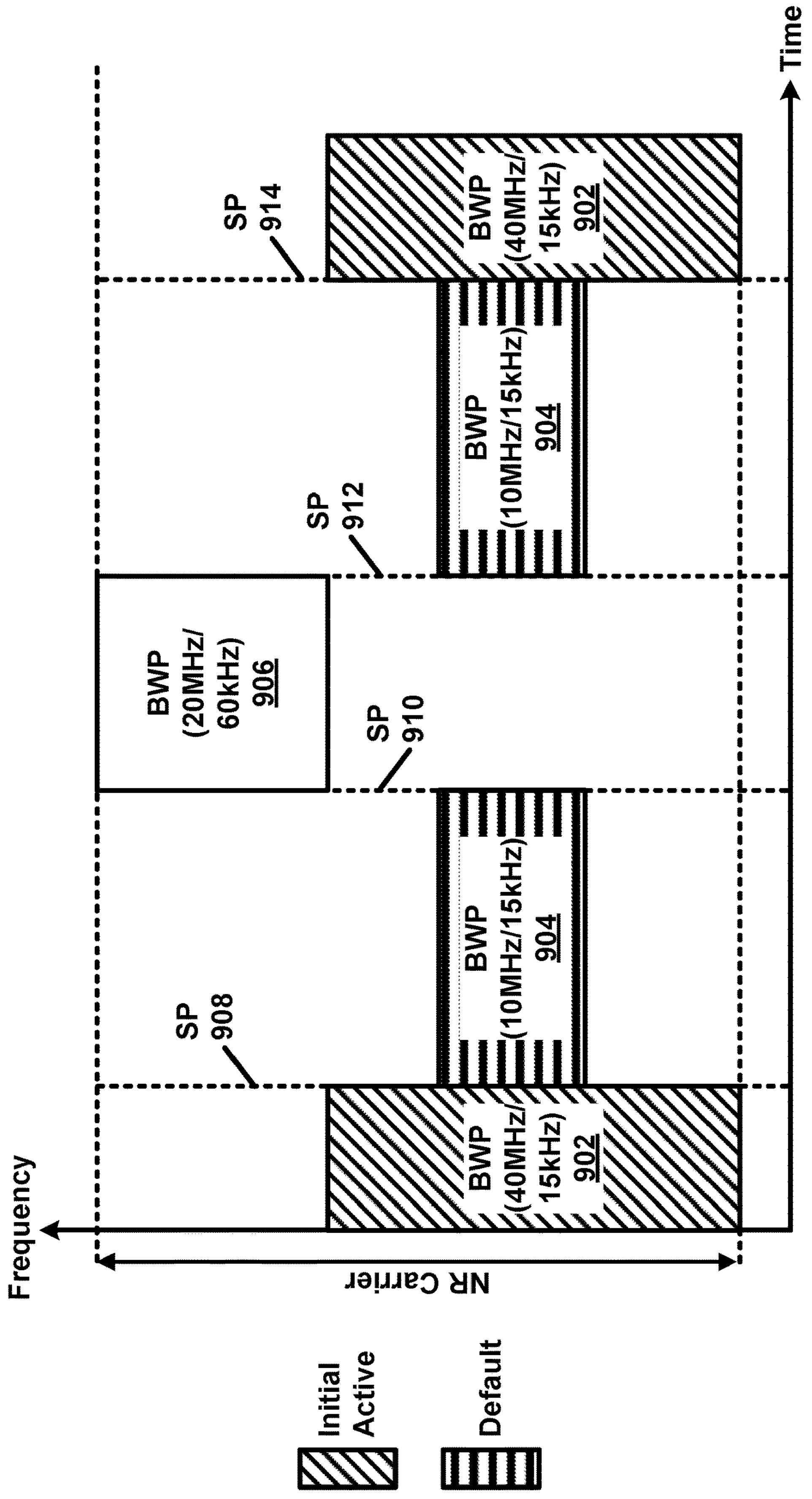
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP

904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
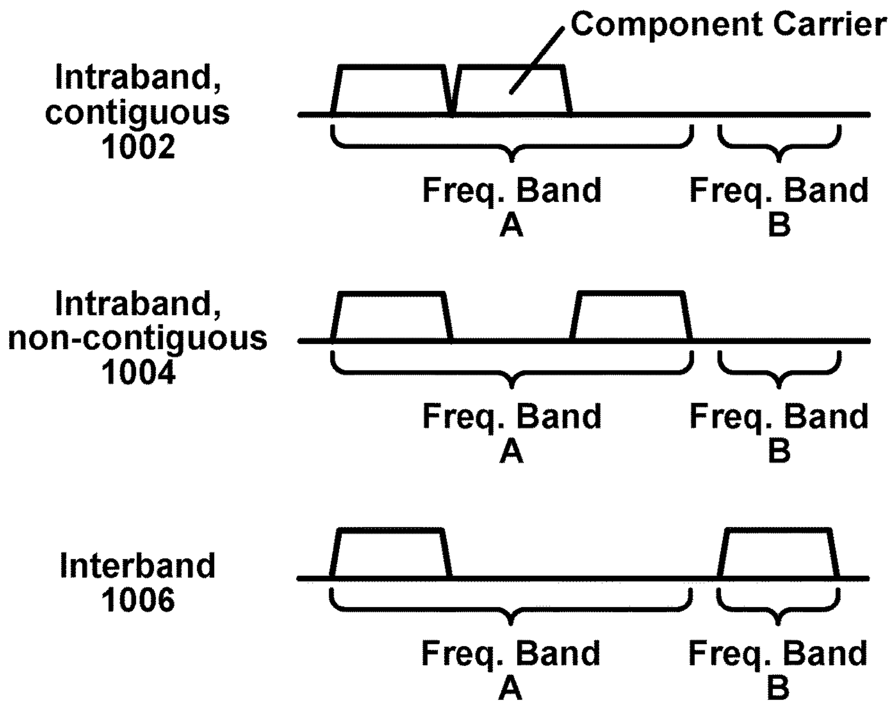
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
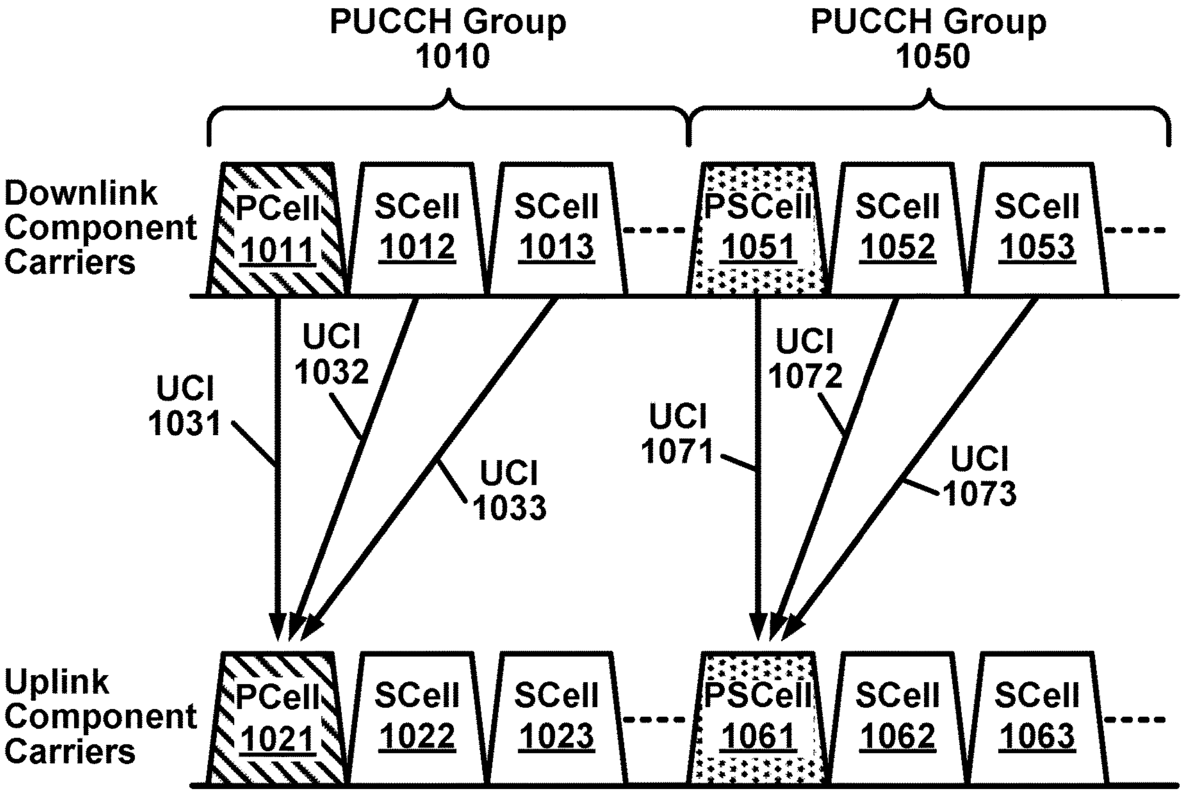
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
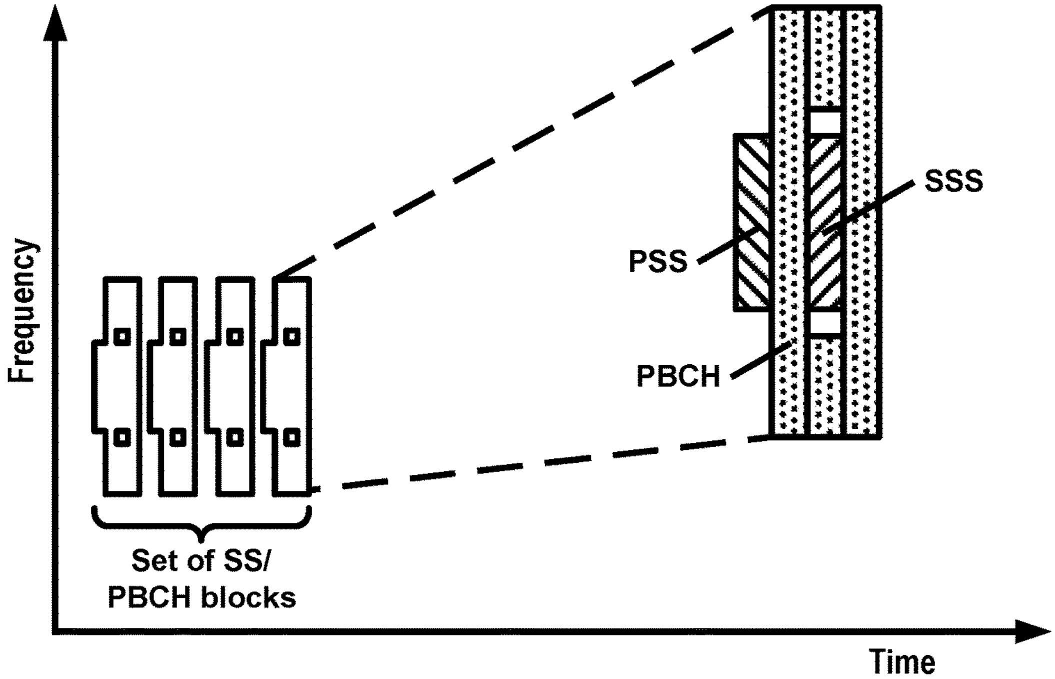
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in an SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
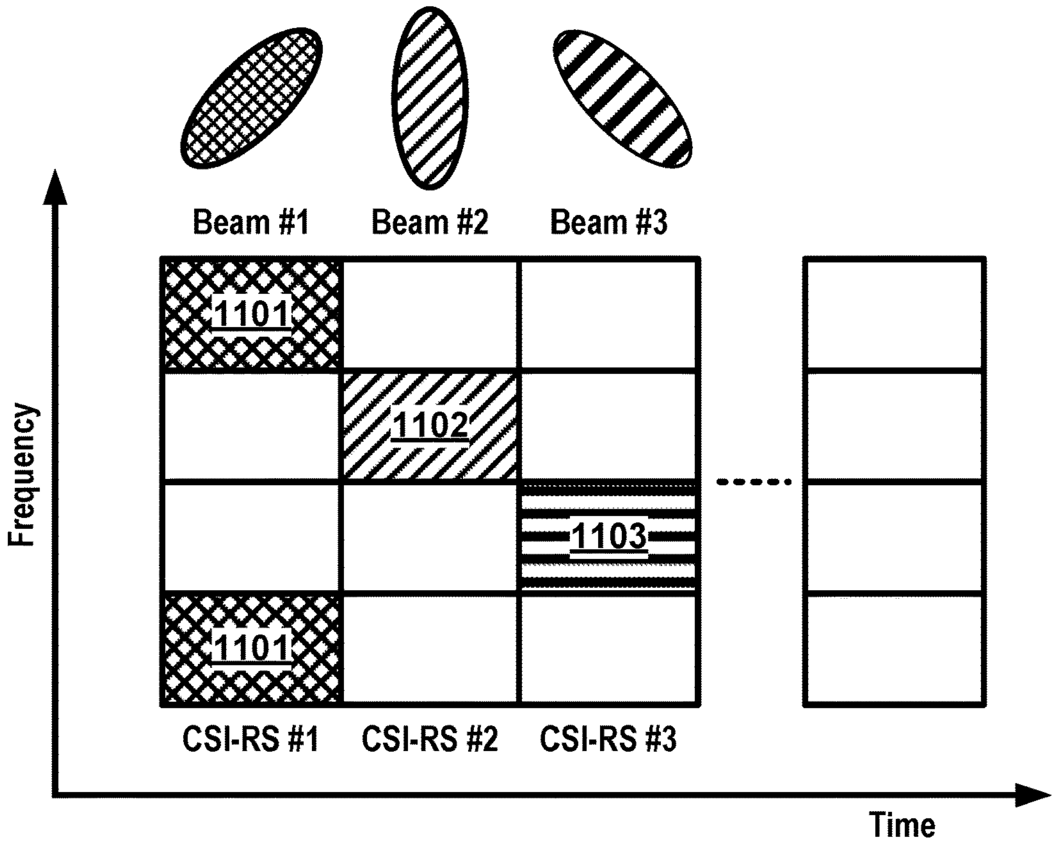
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
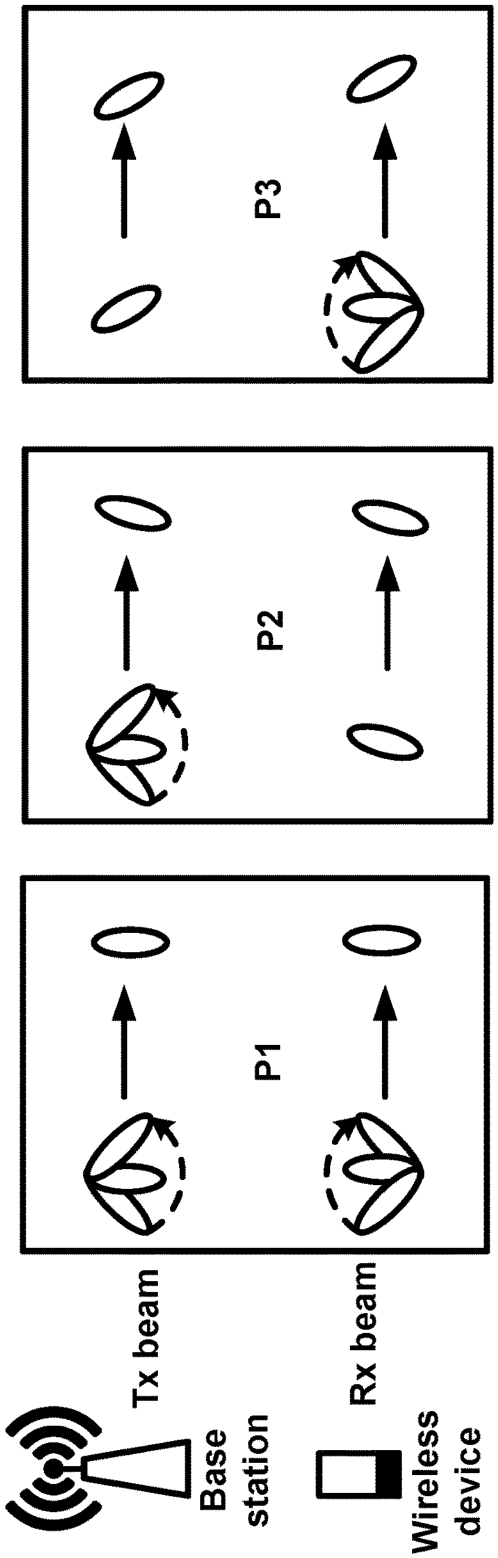
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
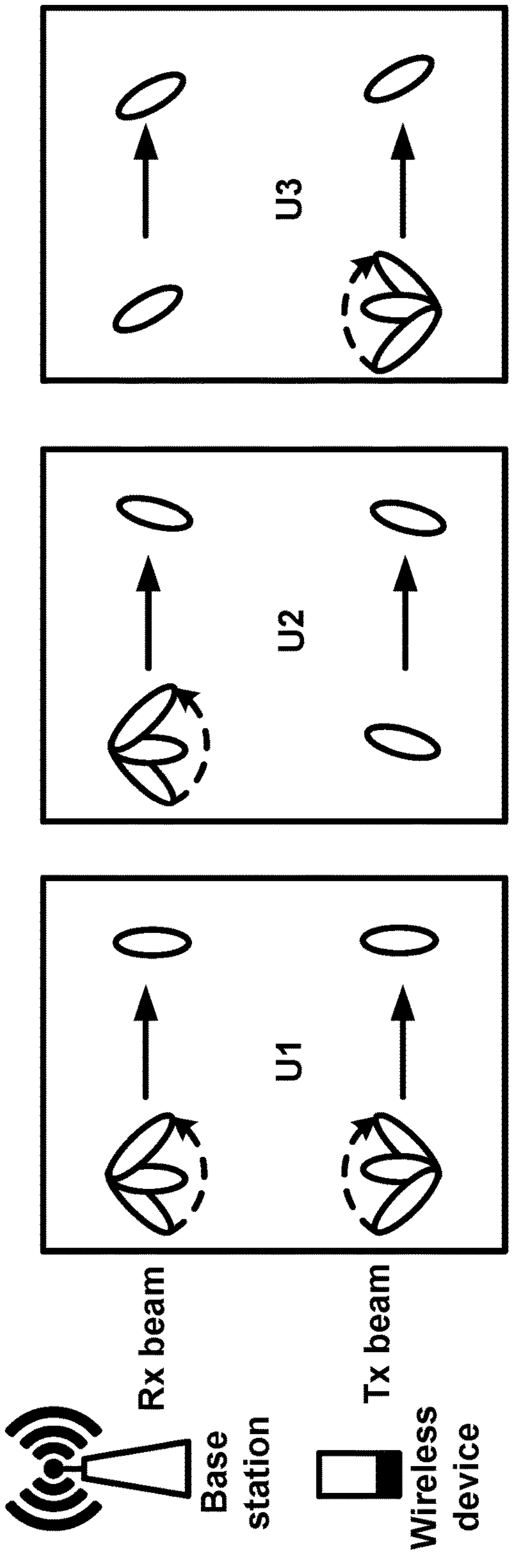
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13A:
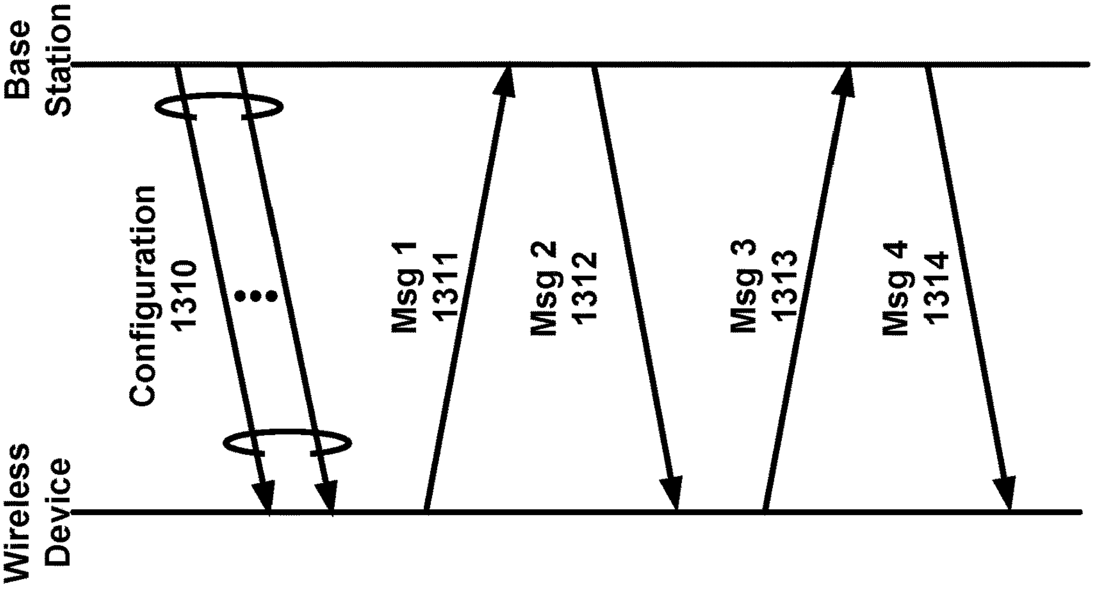
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-ConfigDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/sending (e.g., transmitting) of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/sending (e.g., transmitting) the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14\times t\_id+14\times 80\times f\_id+14\times 80\times 8\times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/sending (e.g., transmitting) of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

Figure 13B:
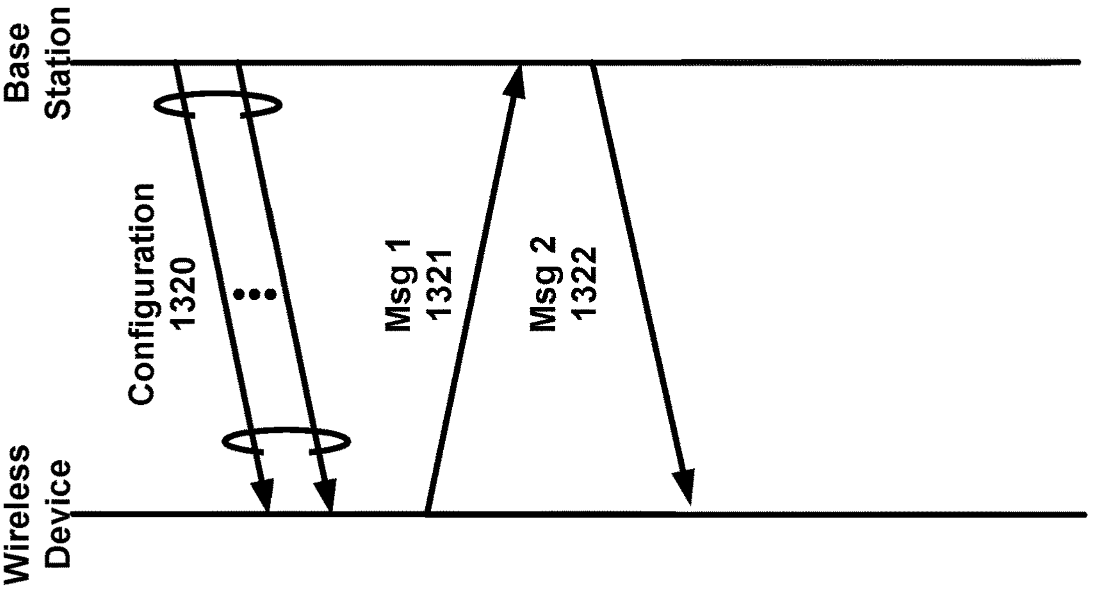
FIG. 13B shows an example two-step random access procedure.

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending (e.g., transmitting) the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending (e.g., transmitting) a beam failure recovery request (e.g., the window may start any quantity of symbols and/or slots after sending (e.g., transmitting) the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) sending (e.g., transmitting) first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

Figure 13C:
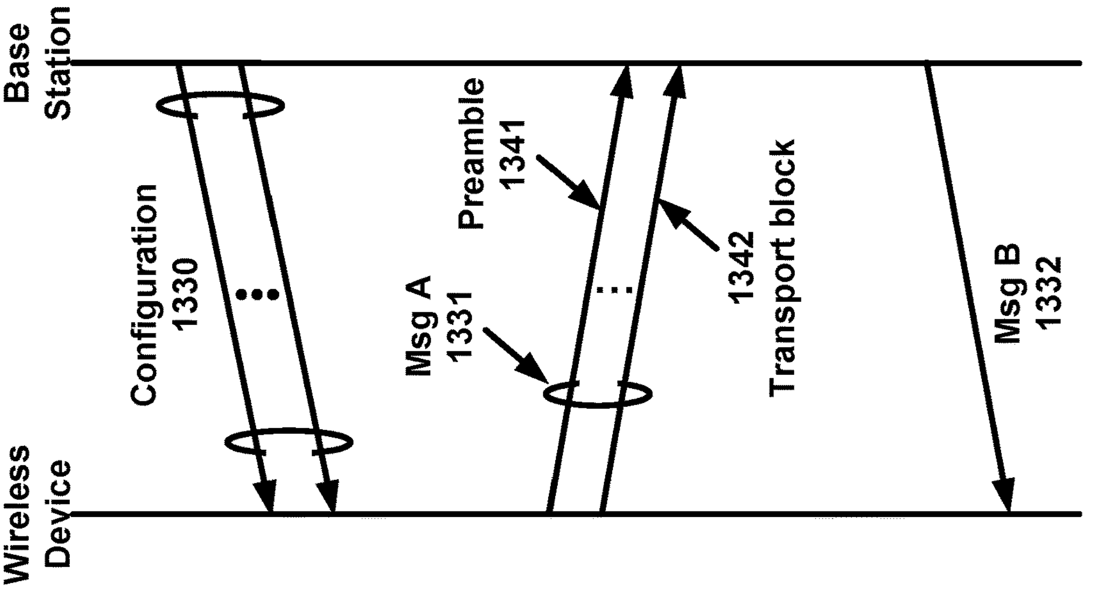
FIG. 13C shows an example two-step random access procedure.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1331 may be sent/transmitted in an uplink transmission by the wireless device. Msg A 1331 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending (e.g., transmitting) the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCI messages may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCI messages with one or more DCI formats, for example, depending on the purpose and/or content of the DCI messages. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 10 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
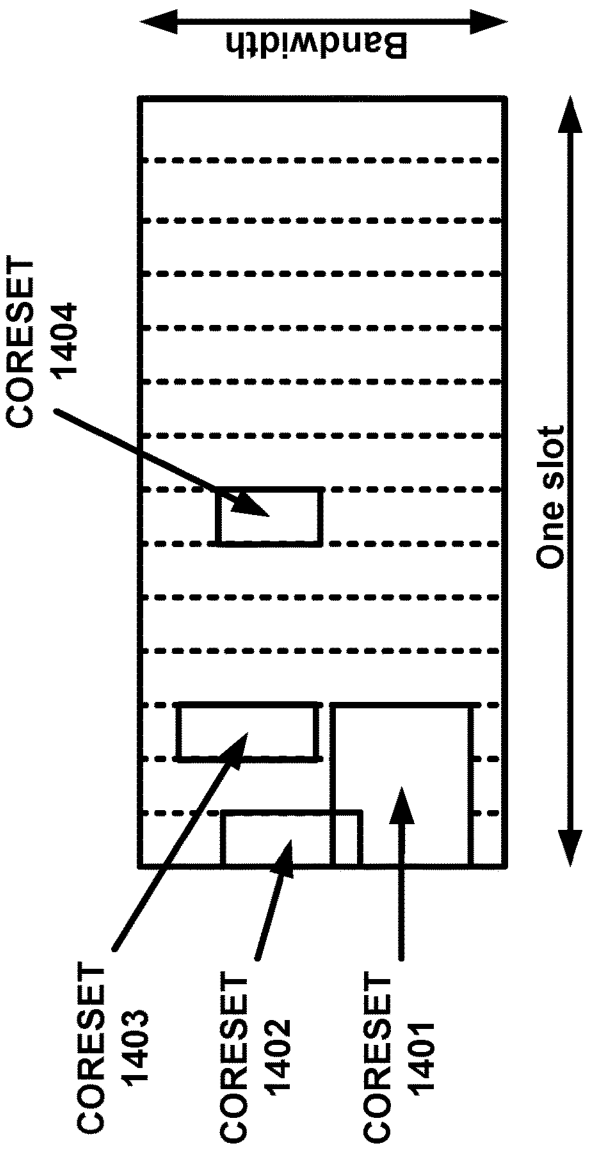
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
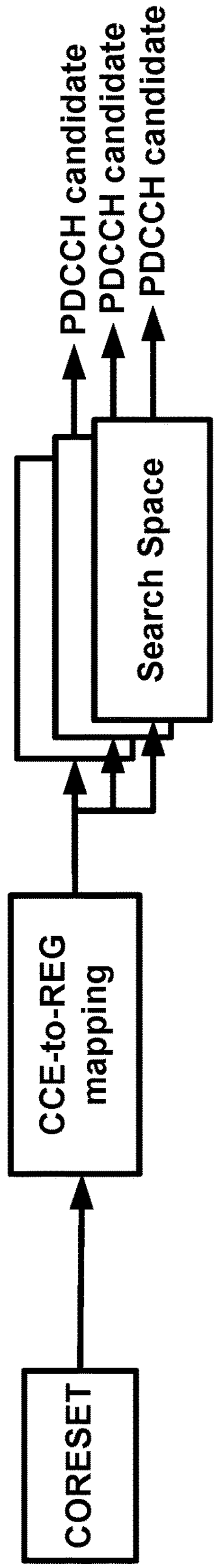
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCI messages. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
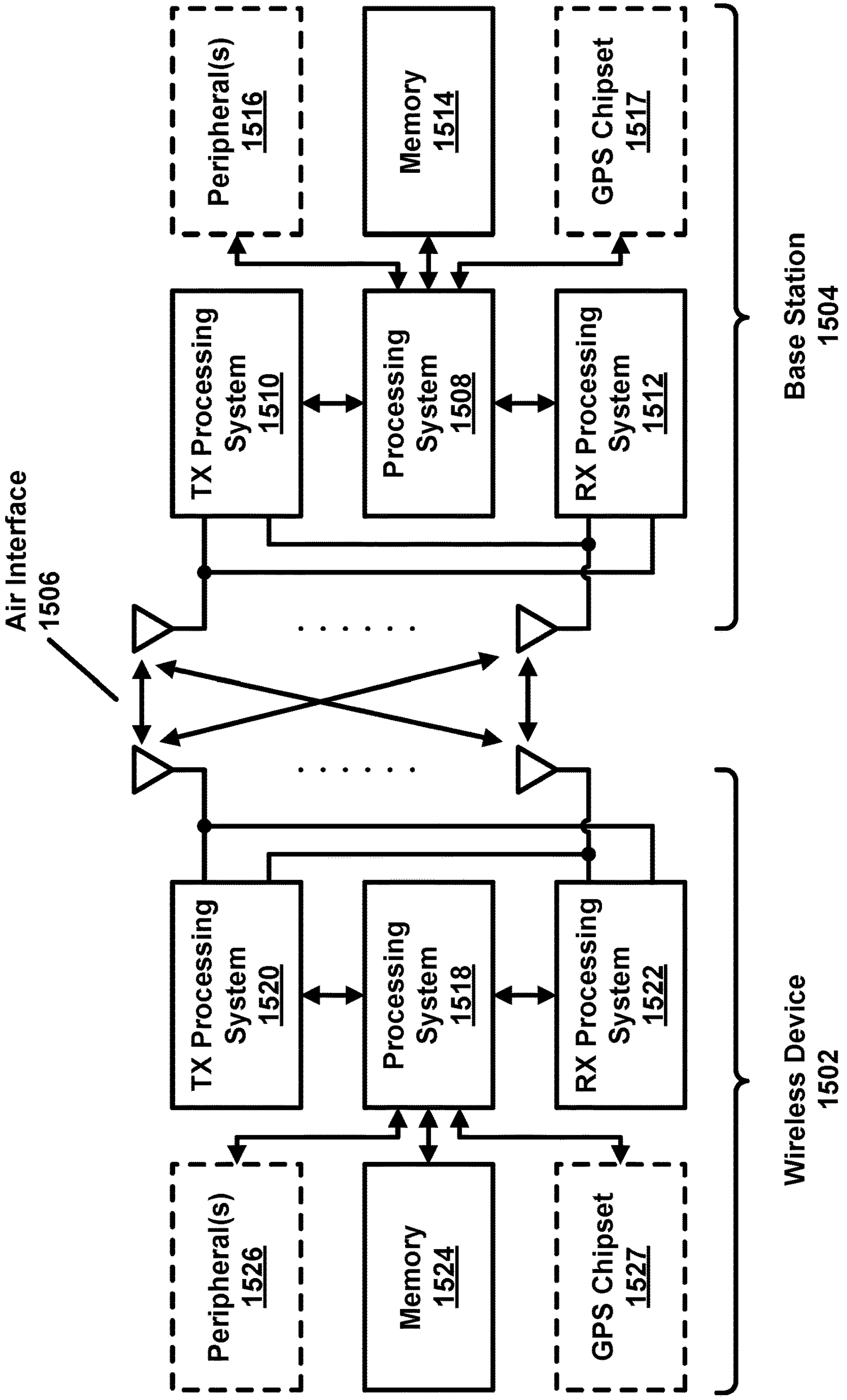
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), afield programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
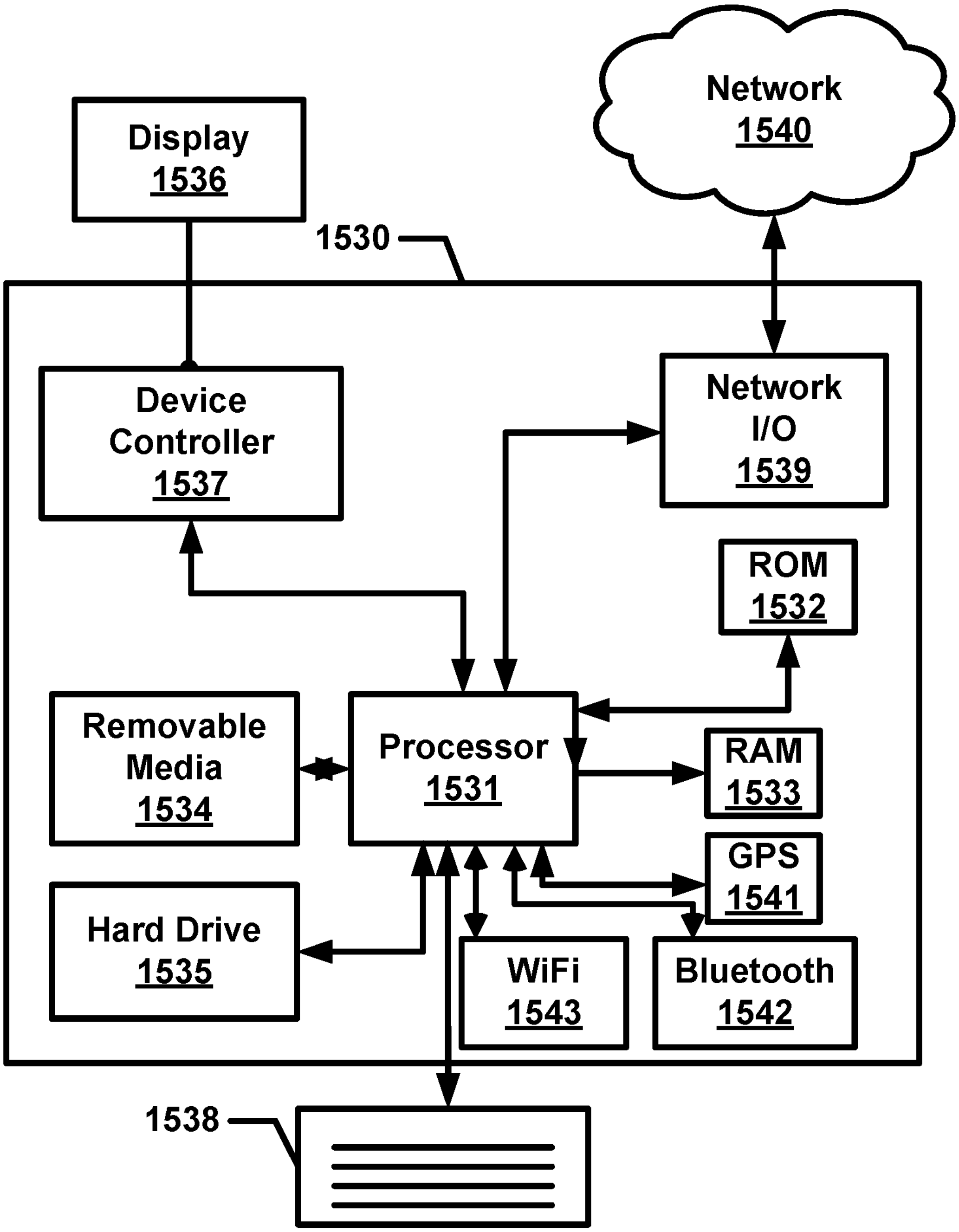
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
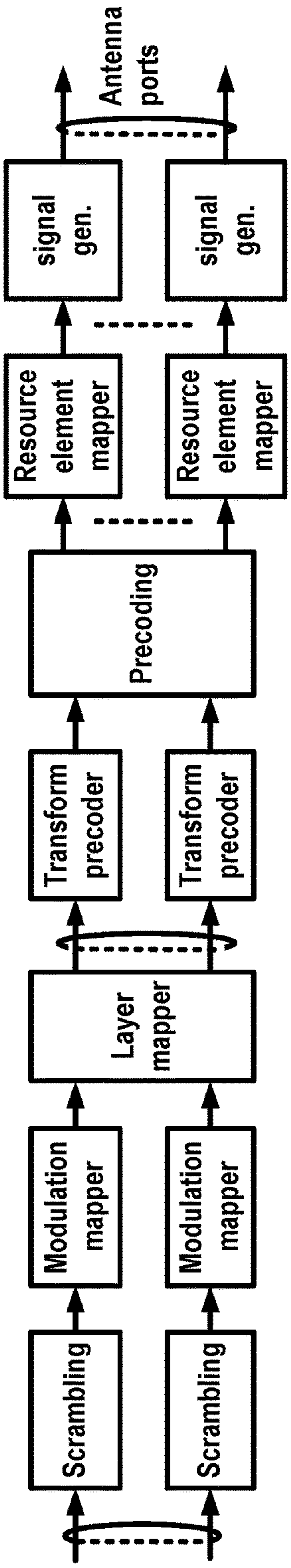
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
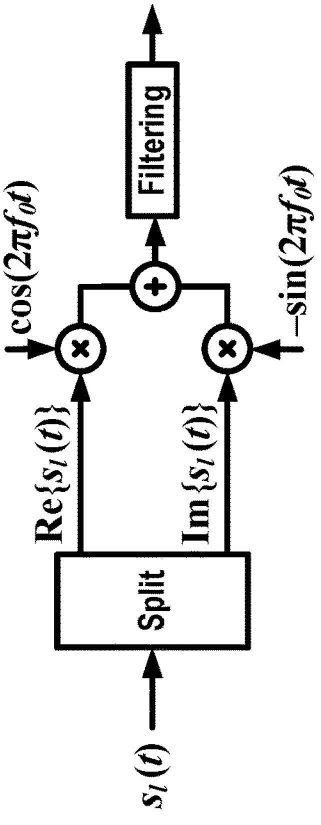

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
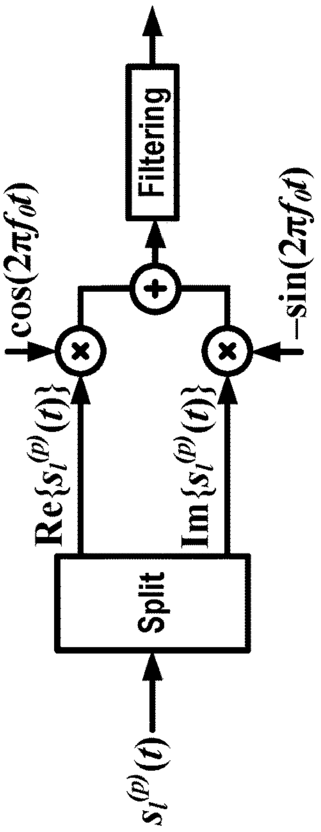
Figure 16C:
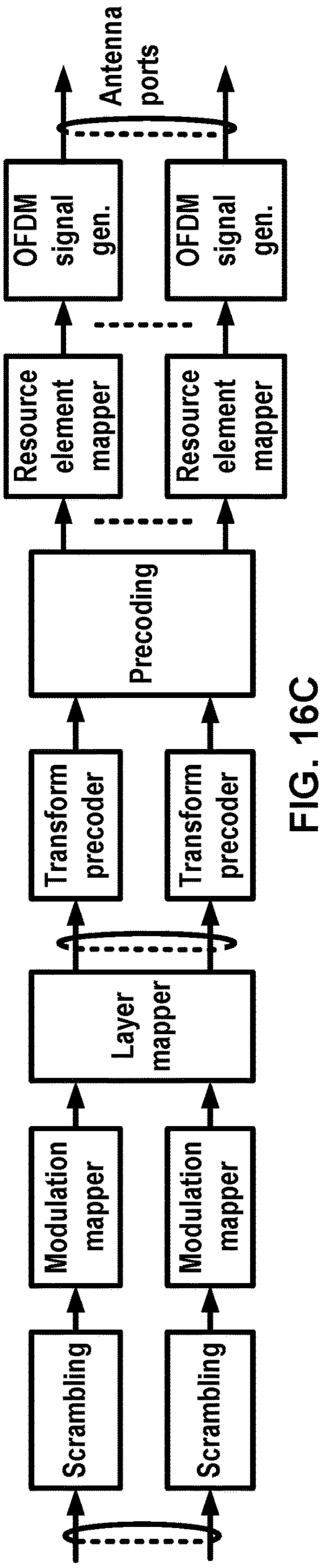

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A base station may transmit one or more MAC PDUs to a wireless device. A MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. The bit order of a parameter field within a MAC PDU is represented with the first and most significant bit in the leftmost bit and the last and least significant bit in the rightmost bit. A MAC SDU may be a bit string that is byte aligned (e.g., aligned to a multiple of eight bits) in length. A MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A MAC entity may ignore a value of reserved bits in a DL MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

When a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

A MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. A MAC CE, such as a MAC CE transmitted by a MAC entity of the base station to a MAC entity of the wireless device, may have an LCID in the MAC subheader corresponding to the MAC CE. A first MAC CE may have a first LCID in the MAC subheader that may be different than the second LCID in the MAC subheader of a second MAC CE. For example, an LCID given by 111011 in a MAC subheader may indicate that the MAC CE associated with the MAC subheader is a long DRX command MAC CE.

The MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. A MAC CE may have an LCID in the MAC subheader corresponding to the MAC CE. A first MAC CE may have a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells). When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. The serving cell may be a PCell. In an example, the base station may transmit, to the wireless device, one or more messages (e.g., one or more downlink signals). The one or more messages may comprise one or more RRC messages, for example, one or more RRC configuration/reconfiguration messages. For example, the one or more RRC messages may comprise one or more configuration parameters (e.g., one or more RRC configuration parameters).

The one or more configuration parameters may comprise configuration parameters of a plurality of one or more SCells, depending on capabilities of the wireless device.

When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate an SCell, for example, based on (e.g., in response to) receiving the SCell Activation/Deactivation MAC CE.

For example, the base station may configure (e.g., via the one or more RRC messages/parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (i.e., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch a DL BWP and an UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP, for example, based on (e.g., in response to) the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or the one DL/UL pair) may improve the wireless device battery consumption. One or more BWPs other than the active UL BWP and the active DL BWP which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: sending (e.g., transmitting) on UL-SCH; sending (e.g., transmitting) on RACH; monitoring a PDCCH; sending (e.g., transmitting) PUCCH; receiving DL-SCH; and/or (re-)initializing any suspended configured uplink grants of configured grant Type 1 according to a stored configuration, if any. On the inactive BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

A DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. The PDCCH may not carry the DCI.

A set of PDCCH candidates for the wireless device to monitor is defined in terms of one or more search space sets. A search space set may comprise a common search space (CSS) set or a UE-specific search space (USS) set. The wireless device may monitor one or more PDCCH candidates in one or more of the following search space sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor the one or more PDCCH candidates according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s) (e.g., number of CCEs, number of PDCCH candidates in CSS set(s), and/or number of PDCCH candidates in the USS(s), and/or possible (or configured) DCI format(s).

The wireless device may receive the C-RNTI (e.g., via one or more previous transmissions) from the base station. For example, the one or more previous transmissions may comprise a Msg2 1312, Msg4 1314, or a MsgB 1332. The wireless device may monitor the one or more PDCCH candidates for DCI format 0_0 and DCI format 1_0 with CRC scrambled by the C-RNTI in the Type1-PDCCH CSS set, for example, if the wireless device is not provided the Type3-PDCCH CSS set or the USS set and if provided the Type1-PDCCH CSS set.

The one or more search space sets may correspond to one or more search parameters. For example, the one or more search space sets may correspond to one or more of searchSpaceZero, searchSpaceSIB1, searchSpaceOtherSystemInformation, pagingSearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS- RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows examples of various DCI formats. The various DCI formats may be used, for example, by a base station to send (e.g., transmit) control information (e.g., downlink control information) to, for example, the wireless device. The DCI formats may be used for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH transmission in one cell. DCI format 01 may be used to schedule one or multiple PUSCH transmissions in one cell and/or to indicate configured grant-downlink feedback information (CG-DFI) for configured grant PUSCH transmission, etc.

The wireless device may support a baseline processing time/capability. For example, the wireless device may support additional aggressive/faster processing time/capability. The wireless device may report to the base station a processing capability (e.g., per sub-carrier spacing). The wireless device may determine, for example, based on PDSCH processing time, a first uplink symbol of a PUCCH (e.g., determined based on a HARQ-ACK timing $K_1$, one or more PUCCH resources to be used, and/or the effect of the TA) comprising the HARQ-ACK information of the PDSCH (e.g., scheduled by DCI). The first uplink symbol of the PUCCH may start at or later than a time gap (e.g., $T_{proc,1}$) after a last symbol of the PDSCH reception associated with the HARQ-ACK information. The first uplink symbol of the PUCCH which carries the HARQ-ACK information may start at or later than symbol $L_1$ start, where $L_1$ is defined as the next uplink symbol with its Cyclic Prefix (CP) starting after the time gap after the end of the last symbol of the PDSCH.

A PUSCH preparation/processing time may be considered for determining the transmission time of an UL data. The wireless device may perform sending (e.g., transmitting) the PUSCH, for example, if the first uplink symbol in the PUSCH allocation for a transport block (including DM-RS) is no earlier than at symbol L2. The symbol L2 may be determined, by a wireless device, at least based on a slot offset (e.g., K2), SLIV of the PUSCH allocation indicated by time domain resource assignment of a scheduling DCI. The symbol L2 may be specified as the next uplink symbol with its CP starting after a time gap with length $T_{proc,2}$ after the end of the reception of the last symbol of the PDCCH carrying the DCI scheduling the PUSCH.

The one or more configuration parameters may comprise one or more DRX configuration parameters (e.g., DRX-Config). The one or more DRX configuration parameters may configure the wireless device with DRX operation. The one or more DRX configuration parameters may indicate monitoring the PDCCH for the DRX operation. For example, when in an RRC_CONNECTED state, if the DRX operation is configured (e.g., the DRX is configured or a DRX cycle is configured), for all the activated Serving Cells (e.g., the serving cell), the MAC entity of the wireless device may monitor the PDCCH discontinuously using the DRX operation. Otherwise, the MAC entity may monitor the PDCCH continuously.

The wireless device may use the DRX operation while communicating with the base station in the serving cell, for example, based on the DRX operation being configured. For example, a MAC entity (or the MAC layer) of the wireless device may control the PDCCH monitoring activity of the MAC entity, for example, based on the DRX operation being configured. The wireless device may monitor the PDCCH for at least one RNTI, for example, if the DRX operation is configured. The at least one RNTI may comprise one or more of the following: C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

The one or more DRX configuration parameters may comprise: DRX on duration timer/period/window (e.g., drx-onDurationTimer) indicating a duration at the beginning of a DRX cycle, drx-SlotOffset indicating a delay before starting the DRX on duration timer, DRX inactivity timer/period/window (e.g., drx-InactivityTimer) indicating a duration after a PDCCH occasion in which the PDCCH indicates a new UL or DL transmission for the MAC entity, DRX retransmission timer of DL (e.g., drx-RetransmissionTimerDL), per DL HARQ process except for the broadcast process, indicating a maximum duration until a DL retransmission is received, DRX retransmission timer of UL (e.g., drx-RetransmissionTimerUL), per UL HARQ process, indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycleTimer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before an UL HARQ retransmission grant is expected by the MAC entity.

The Serving Cells (e.g., the serving cell) of a MAC entity may be configured the one or more DRX configuration parameters in two DRX groups with separate DRX parameters. There may be only one DRX group (e.g., a DRX group) and the Serving Cells (e.g., the serving cell) may belong to the DRX group, for example, if a secondary DRX group is not configured. Each Serving Cell (e.g., the serving cell) is uniquely assigned (or belong) to either of the DRX group or the second DRX group, for example, if the two DRX groups are configured (e.g., the DRX group and a second DRX group). The DRX configuration parameters that are separately configured for each DRX group are: the DRX on duration timer (e.g., the drx-onDurationTimer) and/or the DRX inactivity timer (e.g., the drx-InactivityTimer). The one or more DRX configuration parameters that are common to the two DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

The wireless device may be in an on duration of the DRX operation (e.g., a DRX on duration) or an off duration of the DRX operation (e.g., a DRX off duration), for example, if the DRX operation is configured. For example, the DRX on duration may start based on starting the DRX on duration timer/period. The wireless device may be in the DRX off duration, for example, if the wireless device is not in the DRX on duration. For example, the DRX off duration may stop based on starting the DRX on duration timer. For example, the wireless device may switch/transit from the DRX on duration to the DRX off duration based on stopping the DRX on duration timer. For example, the wireless device may switch/transit from the DRX off duration to the DRX on duration based on starting the DRX on duration.

The wireless device may determine whether the wireless device is in an active time (or a DRX active state or Active Time) for the serving cell (or the Serving Cells) in the DRX group, for example, if the DRX operation is configured. For example, the wireless device may determine that the active time for the serving cell in the DRX group comprises the DRX on duration.

The wireless device may determine that the active time for the serving cell in the DRX group comprises the time while: the DRX on duration timer (e.g., drx-onDurationTimer) or the DRX inactivity timer (e.g., drx-InactivityTimer) configured for the DRX group is running, or the DRX retransmission timer of DL (e.g., drx-RetransmissionTimerDL) or the DRX retransmission timer of the UL (e.g., drx-RetransmissionTimerUL) is running on any of the Serving Cells (e.g., the serving cell) in the DRX group, or a contention resolution timer (e.g., ra-ContentionResolutionTimer) or a message B (MsgB) response window (e.g., msgB-ResponseWindow) is running, or a scheduling request (SR) is sent/transmitted on PUCCH and is pending, or a PDCCH indicating a new transmission addressed to the C-RNTI not being received after successful reception of a random access response (RAR) for a Random Access Preamble (or a preamble 1311/1321/1341) that is not selected by the MAC entity among the contention-based Random Access Preamble(s).

The wireless device may be in a DRX inactive state (or a DRX non-active time or a DRX non-active state), for example, if the wireless device is outside the active time for the serving cell in the DRX group. The wireless device may be in a DRX active state, for example, if the wireless device is in the active time for the serving cell in the DRX group.

The wireless device may evaluate one or more DRX active time conditions (or one or more DRX Active Time conditions) to determine whether the wireless device is in the active time (for the serving cell in the DRX group) or not. The wireless device may, for example, based on evaluating the one or more DRX active time conditions, determine that the wireless device is in active time based on the one or more DRX active time conditions being satisfied.

The one or more DRX active time conditions may be satisfied based on the DRX on duration timer (e.g., drx-onDurationTimer) configured for the DRX group is running, or the DRX inactivity timer (e.g., drx-InactivityTimer) configured for the DRX group is running, or the DRX retransmission timer for DL (e.g., drx-RetransmissionTimerDL), on any of the Serving Cells (including the serving cell) in the DRX group, is running, or the DRX retransmission timer for UL (e.g., drx-RetransmissionTimerUL), on any of the Serving Cells (including the serving cell) in the DRX group, is running, or the contention resolution timer (e.g., ra-ContentionResolutionTimer) is running, or the MsgB response window (e.g., msgB-ResponseWindow) is running, or the PDCCH indicating the new transmission addressed to the C-RNTI (after successful reception of RAR for preamble that is not selected by the MAC entity among the contention-based preamble(s)) has been received, or the SR is sent/transmitted on PUCCH and is pending.

Although some examples may use a non-terrestrial network and/or a terrestrial network, those examples are not intended to be limiting, and the technology and/or concepts may apply to any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. FIG. 18A shows an example of a non-terrestrial network, which may be part of a communication network, such as the communication network 100 shown in FIG. 1A, the communication network 150 shown in FIG. 1B, or any other communication network. The non-terrestrial network (NTN) network (e.g., a satellite network) may be a network or network segment (e.g., an NG-RAN consisting of gNBs) for providing non-terrestrial NR access to wireless devices. The NTN may use a space-borne vehicle to embark a transmission equipment relay node (e.g., radio remote unit or a transparent payload) or a base station (or a regenerative payload). A terrestrial network is a network located on the surface of the earth. An NTN may be a network which uses an NTN node (e.g., a satellite) as an access network, a backhaul interface network, or both. An NTN may comprise one or more NTN nodes (or payloads and/or space-borne vehicles), each of which may provide connectivity functions, between the service link and the feeder link.

An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding) and connect to a base station (e.g., a base station of an NTN or the NTN base station or a non-terrestrial access point) via a feeder link. As shown in FIG. 18A, the base station (e.g., a gNB) may further comprise the transparent NTN node, the feeder link, and/or a gateway (e.g., an NTN gateway). The gateway may be an earth station that is located at the surface of the earth, providing connectivity to the NTN payload using a feeder link. The NTN node with the regenerative payload (e.g., the base station of the NTN or the NTN base station) may comprise functionalities of a base station, for example, the on-board processing used to demodulate and decode the received signal and/or regenerate the signal before sending/transmitting it back to the earth. As shown in FIG. 18A, the base station (e.g., the gNB) may further comprise the regenerative NTN node, the feeder link, and/or the gateway (e.g., the NTN gateway).

The NTN node may be a satellite, a balloon, an air ship, an airplane, an unmanned aircraft system (UAS), an unmanned aerial vehicle (UAV), a drone, or the like. For example, the UAS may be a blimp, a high-altitude platform station (HAPS), for example, an airborne vehicle embarking the NTN payload placed at an altitude between 8 and 50 km, or a pseudo satellite station. FIG. 18B is an example figure of different types of NTN platforms. A satellite may be placed into a low-earth orbit (LEO) at an altitude between 250 km to 1500 km, with orbital periods ranging from 90-130 minutes. From the perspective of a given point on the surface of the earth, the position of the LEO satellite may change. A satellite may be placed into a medium-earth orbit (MEO) at an altitude between 5000 to 20000 km, with orbital periods ranging from 2 hours to 14 hours. A satellite may be placed into a geostationary satellite earth orbit (GEO) at 35,786 km altitude, and directly above the equator.

From the perspective of a given point on the surface of the earth, the position of the GEO satellite may not change.

Figures 19A, 19B:
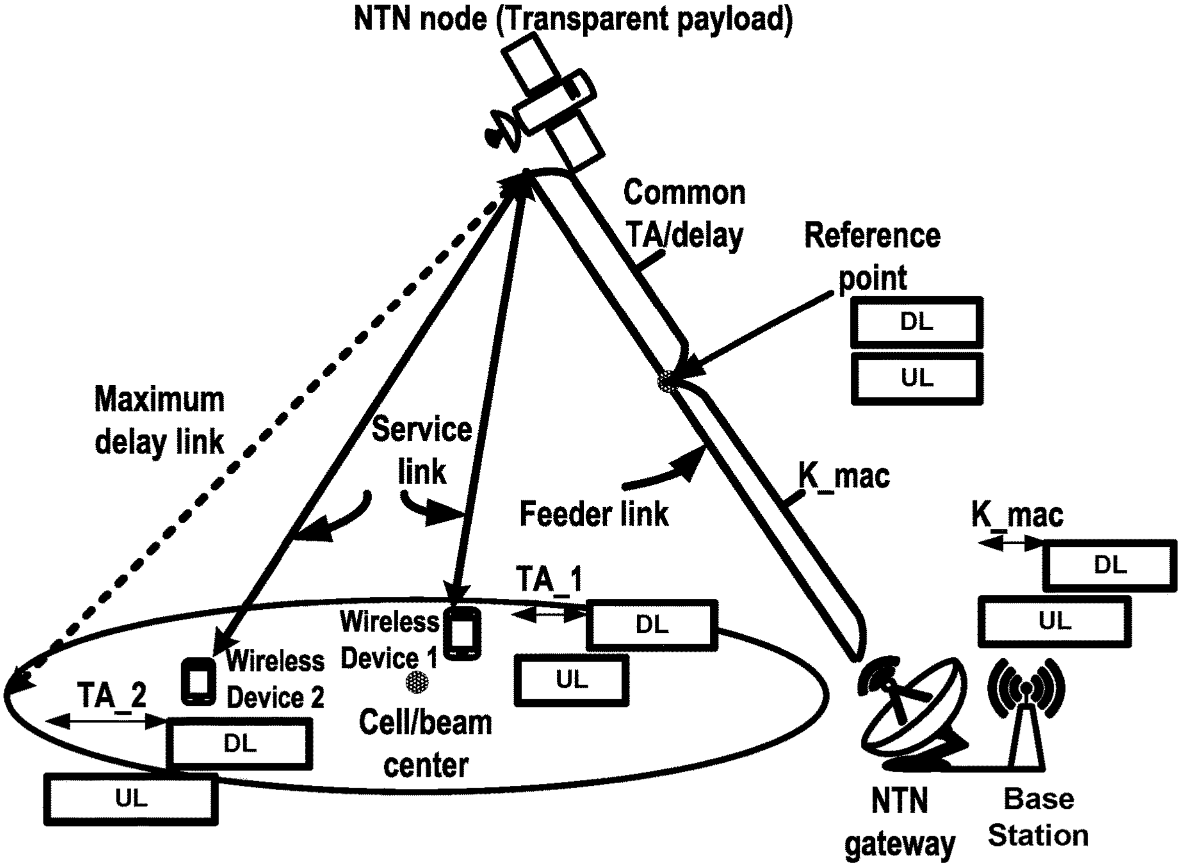
FIG. 19A shows an example of an NTN with a transparent NTN platform.
FIG. 19B shows examples of propagation delay corresponding to NTNs of different altitudes.

FIG. 19A shows an example of an NTN with a transparent NTN platform, which may be part of a communication network, such as the communication network 100 shown in FIG. 1A, the communication network 150 shown in FIG. 1B, or any other communication network. As shown in FIG. 19A, the NTN node (e.g., the satellite) may forward a received signal from the NTN gateway on the ground back to the earth over the feeder link. The gateway and the base station may not be collocated. The NTN node may forward a received signal to the wireless device or the base station from another NTN node, for example, over inter-link satellite communication links.

The NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed with some beam pointing mechanism used by the satellite to compensate for its motion (e.g., a LEO with earth fixed cells). As shown in FIG. 18B, the size of a spotbeam may range from tens of kilometers to a few thousand kilometers. For example, the size of the spotbeam may depend on the system design.

A propagation delay may be an amount of time it takes for the head of the signal to travel from a sender (e.g., the base station or the NTN node) to a receiver (e.g., the wireless device) or vice versa. For uplink, the sender may be the wireless device and the receiver may be the base station/access network. For downlink, the sender may be the base station/access network and the receiver may be the wireless device. The propagation delay may vary depending on a change in distance between the sender and the receiver, for example, due to movement of the NTN node, movement of the wireless device, a change of an inter-satellite link, and/or feeder link switching.

FIG. 19B shows examples of propagation delay corresponding to NTNs of different altitudes. The propagation delay in the figure may be one-way latency/delay. One-way latency/delay may be an amount of time used to propagate through a telecommunication system from the sender (e.g., the base station) to the receiver (e.g., the wireless device). In an example shown in FIG. 19B, for the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or the RTD) may be twice of the one-way delay between the wireless device and the base station. From FIG. 19B, in case of a GEO satellite with the transparent payload, the RTD may be four times of 138.9 milliseconds (approximately 556 milliseconds). The RTD of a terrestrial network (e.g., NR, E-UTRA, LTE) may be negligible compared to the RTD of an NTN example (e.g., the RTD of a terrestrial network may be less than 1 millisecond). A maximum RTD of a LEO satellite with the transparent payload and altitude of 600 km is approximately 25.77 milliseconds and with altitude of 1200 km is approximately 41.77 milliseconds.

A differential delay within a beam/cell of a NTN node may depend on, for example, the maximum diameter of the beam/cell footprint at nadir. For example, the differential delay within the beam/cell may depend on the maximum delay link in FIG. 19A. The differential delay may imply the maximum difference between communication latency that two wireless devices, for example, a first wireless device (UE1) that is located close to the center of the cell/beam and a second wireless device (UE2) that is located close to the edge of the cell/beam in FIG. 19B, may experience while communicating with the base station via the NTN node. The first wireless device may experience a smaller RTD compared to the second wireless device. The link with a maximum propagation delay (e.g., the maximum delay link) may experience the highest propagation delay (or the maximum RTD) in the cell/beam. The differential delay may imply a difference between the maximum delay of the cell/beam and a minimum delay of the cell/beam. The service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, depending on implementation, the differential delay may be as large as 32 milliseconds.

The wireless device (e.g., the first wireless device and/or the second wireless device in FIG. 19B) may receive the one or more configuration parameters, for example, the one or more RRC configuration parameters from the base station. For example, the one or more configuration parameters may comprise one or more NTN configuration parameters. The wireless device may indicate a capability for NR NTN access (e.g., nonTerrestrialNetwork-r17), for example, to receive the one or more NTN configuration parameters (e.g., via one or more NTN-specific SIBs). For example, the one or more NTN configuration parameters may be received, by the wireless device, from a broadcast system information (e.g., SIB1 and/or the one or more NTN-specific SIBs). The one or more NTN configuration parameters may facilitate/manage the calculation/determination/measurement of the propagation delay (e.g., the UE-gNB RTT) and/or a timing advance (TA) at one or more wireless devices (e.g., the wireless device) camping in the cell/beam. The one or more NTN configuration parameters may comprise at least one or more ephemeris parameters (e.g., satellite ephemeris parameters or NTN ephemeris parameters), one or more common delay/TA parameters, a validity duration/timer/window (e.g., ntn-UlSyncValidityDuration) for UL synchronization, an epoch time, and/or one or more timing offset parameters. For example, the one or more NTN configuration parameters may enable a TA reporting.

The wireless device may maintain/calculate a cell-specific timing offset, one or more beam-specific timing offsets, and/or a UE-specific timing offset (e.g., UE-specific K_Offset) based on the one or more timing offset parameters and/or one or more MAC CE commands and/or one or more RRC signaling. For example, the one or more timing offset parameters may comprise a first timing offset (e.g., Koffset in ServingCellConfigCommon). The first timing offset may account for the maximum RTD of the cell/beam. For example, the wireless device may track/update/maintain the cell/beam-specific timing offset based on receiving an update of the first timing offset from the base station. For example, the wireless device may receive a second timing offset (e.g., a Differential UE-Specific K_Offset MAC CE). The wireless device may update/track/maintain the UE-specific timing offset based on the second timing offset and/or the cell-specific timing offset.

The one or more timing offset parameters may configure/indicate a third timing offset. The wireless device (or the base station) may set a MAC-specific timing offset (or a MAC layer timing offset), denoted by K-Mac, based on the third timing offset. For example, K-Mac may be 0, for example, if the third timing offset is not indicated/configured. For example, in an NTN example with the transparent NTN node, the third timing offset may be absent from the one or more NTN configuration parameters or may be 0, for example, if the UL frame and the DL frame is aligned at the base station. As shown in FIG. 19B, the MAC-specific timing offset may indicate a portion of the propagation delay (e.g., the UE-gNB RTT) that the base station may pre-compensate (e.g., when the UL frame and the DL frame are not aligned at the base station), for example, the third timing offset may indicate the difference between the UL frame/configuration timing and the DL frame/configuration timing at the base station. As shown in FIG. 19B, the UL frame and DL frame may be aligned at a reference point on the feeder link. For example, the reference point may be the NTN node, for example, the third timing offset is equal to the feeder link delay.

To maintain uplink orthogonality, transmissions from different wireless devices in a cell/beam (e.g., the first wireless device and the second wireless device in FIG. 19B) may be time-aligned at the base station and/or the NTN node (e.g., satellite). Time alignment/synchronization may be achieved by using different timing advance (TA) values at different wireless devices to compensate for their different propagation delays (or RTDs). As shown in FIG. 19B, the first wireless device may use the first TA value (e.g., TA_1) and the second wireless device may use the second TA value (TA_2).

The wireless device may calculate/measure/maintain a current TA (value) of the wireless device (e.g., $N_{TA}$), for example, based on at least a combination of a closed-loop TA procedure/control and/or an open-loop TA procedure/control. The current TA value of the first wireless device may be TA_1 and the current TA value of the second wireless device may be TA_2.

The closed-loop TA procedure/control may be based on receiving at least one TA command (TAC) MAC CE from the base station. For example, the at least one TAC CE may comprise a TA (or an absolute TA) command field of a Msg2 1312 (or a MsgB 1332).

The open-loop TA procedure/control may use a GNSS-acquired position (or location information) of the wireless device and/or receiving the one or more NTN configuration parameters, for example, the one or more ephemeris parameters (e.g., the satellite ephemeris data), and/or the one or more common delay/TA parameters (e.g., the common TA value). The wireless device may, for example, based on an implemented orbital predictor/propagator model, use the one or more ephemeris parameters (and/or the GNSS-acquired position) to measure/calculate/maintain movement pattern of the satellite, estimate/measure the service link delay, and/or to adjust the current TA value (e.g., the TA of the wireless device) via the open-loop TA procedure/control. A combination of the closed-loop TA control and the open-loop TA control may be based on adding/summing the open-loop TA value (e.g., derived/calculated based on the open-loop TA procedure/control) and the closed-loop TA value (or a portion of the closed-loop TA procedure/control).

The wireless device may calculate/measure/estimate the UE-gNB RTT (or the RTD) based on the current TA value and the third timing offset (e.g., K-Mac). For example, the UE-gNB RTT may be the summation of the current TA value and K-Mac. The wireless device may determine/measure the UE-gNB RTT based on the current TA value, for example, the UE-gNB RTT is equal to the current TA value, for example, if the third timing offset is not indicated or when the K-Mac is 0. The wireless device may maintain/calculate/update the open-loop TA value (or the UE-gNB RTT) over the validity duration. For example, the validity duration may indicate the validity period of the (satellite) ephemeris data/information and/or the one or more common TA parameters. The validity duration may specify/indicate a maximum period/window (e.g., corresponding to an orbit predictor/propagator model the wireless device is using to estimate/calculate the propagation delay and/or a maximum tolerable error in estimating/measuring/calculating the open-loop TA value) during which the wireless device may not read/update/acquire the satellite ephemeris data and/or to acquire the one or more NTN-specific SIBs. The wireless device may, for example, based on (e.g., upon or in response to) acquiring the new (satellite) ephemeris data (or parameters) and/or the one or more NTN-specific SIBs, start/restart the validity duration based on the epoch time indicated by the one or more NTN configuration parameters. The wireless device may acquire the one or more NTN-specific SIBs to receive an updated (satellite) ephemeris data/information and/or an update of the one or more common TA parameters, for example, based on (e.g., in response to) determining that the validity duration being expired. The wireless device may, for example, based on (e.g., upon) the expiry of the validity duration and if the wireless device is not able to acquire the one or more NTN-specific SIBs, become unsynchronized with the base station, for example, for UL communication with the base station.

The wireless device may calculate/measure/update the current TA value via the open-loop TA procedure/control, for example, based on (e.g., in response to) receiving the one or more NTN configuration parameters (e.g., via acquiring the one or more NTN-specific SIBs) and/or acquiring an updated GNSS-acquired position. The wireless device may update the current TA value based on the closed-loop TA procedure/control, for example, based on receiving the one or more TAC MAC CEs. The wireless device may adjust (recalculate) the UE-gNB RTT, for example, based on the current TA value being updated. The wireless device may set K-Mac and adjust (recalculate) the UE-gNB RTT, for example, based on receiving a new third timing offset. The wireless device may periodically calculate/measure/update the current TA value. For example, the wireless device may, prior to performing an uplink transmission, calculate/measure/update the current TA value.

The wireless device may set the common TA/delay by zero, for example, based on (e.g., in response to) determining that the one or more common TA/delay parameters are absent from the one or more NTN configuration message. The common TA/delay may be zero, for example, if the reference point is located at the NTN node (e.g., the third timing offset is equal to the feeder link delay). For an NTN with the transparent payload, the wireless device may not pre-compensate the common TA, for example, if the UL timing synchronization is held at the NTN node (e.g., the UL and DL frames are aligned at the base station).

The wireless device with GNSS capability may estimate the propagation delay (or the service link delay) based on one or more measurements. For example, the one or more measurements may indicate the GNSS-acquired location information (position) of the wireless device. The one or more measurements may allow the wireless device to calculate/estimate the propagation delay (or the open-loop TA value) using the GNSS-acquired position and the (satellite) ephemeris data/information. The one or more measurements may allow the wireless devices to estimate/calculate the propagation delay via one or more timestamps (e.g., the timestamp of a configured broadcast signal) and/or the epoch time. The one or more measurements may allow the wireless device to estimate/measure a variation rate by which the common TA and/or the service link delay changes over a period.

A wireless device may suspend the control channel monitoring (e.g., PDCCH monitoring) after sending (e.g., transmitting) an uplink signal. A base station may configure the wireless device (e.g., via PDCCH-Config in the one or more configuration parameters) to skip/avoid/stop/terminate monitoring control channels (e.g., to skip monitoring PDCCH or to skip PDCCH monitoring). For example, the PDCCH-Config may comprise at least one time duration (e.g., pdcch-SkippingDurationList). The wireless device may skip monitoring PDCCH during the time duration on the active DL BWP of a cell (e.g., a serving cell) based on (e.g. in response to) receiving DCI indicating skipping PDCCH monitoring for a time duration (e.g., in a number of slots) of the at least one time duration. The DCI may comprise a filed (e.g., a 'PDCCH monitoring adaptation indication' filed) indicating the time duration for skipping monitoring PDCCH. The skipping monitoring PDCCH (e.g., indicated by the DCI), e.g., for the time duration, may reduce consumed power of the wireless device.

In a terrestrial network (TN) scenario (e.g., when the serving cell is not part of an NTN), the wireless device may resume PDCCH monitoring starting at the beginning/starting (or a first/initial/earliest symbol) of a first/initial/starting/earlies slot after a last/final/ending/latest symbol of the PUCCH transmission/occasion if the wireless device sends (e.g., transmits) a PUCCH providing/carrying a (positive) SR after the wireless device receives the DCI (e.g., comprising the 'PDCCH monitoring adaptation indication' field for skipping PDCCH monitoring for the time duration). In a NTN scenario (e.g., when the serving cell is part of the NTN) with a long propagation delay (e.g., approximately 600 milliseconds in the GEO satellite, e.g., at most 600 times longer than a maximum propagation delay in a TN scenario, and approximately 21-42 milliseconds in the LEO satellite, e.g., approximately 21-42 times longer than the maximum propagation delay in the TN scenario), the wireless device may, based on existing technologies, unnecessarily resume PDCCH monitoring (e.g., cancel/terminate the PDCCH skipping) starting at the beginning/starting (or a first/initial/earliest symbol) of the first/initial/starting/earlies slot that is after the last/final/ending/latest symbol of the PUCCH transmission/occasion. In an NTN scenario with a long propagation delay, the consumed power of the wireless device may not necessarily reduce (e.g., due to unnecessarily resuming the PDCCH monitoring after the last/final/ending/latest symbol of the PUCCH transmission/occasion). Hence, improvements for monitoring (or skipping monitoring) PDCCH in an NTN scenario with a long propagation delay may be required to prevent an unnecessarily increase of the consumed power of the wireless device.

A wireless device may avoid resuming (e.g., not resume) the PDCCH monitoring on the DL active BWP of the cell (e.g., the serving cell) for (and/or despite/irrespective of) a transmission of an UL signal (e.g., the PUCCH providing the positive SR) after receiving the DCI indicating the PDCCH skipping (e.g., the DCI with the 'PDCCH monitoring adaptation indication' filed indicating the time duration for skipping monitoring PDCCH). The wireless device may keep skipping the PDCCH monitoring on the DL active BWP of the cell after a last/final/ending/latest symbol of a transmission/occasion of the UL signal (e.g., the last/final/ending/latest symbol of the PUCCH transmission/occasion). For example, the cell (e.g., the serving cell) may be part of an NTN. Skipping the PDCCH monitoring on the DL active BWP of the cell may improve the battery life of the wireless device by reducing consumed power of the wireless device (e.g., reducing consumed power for the PDCCH monitoring) if the wireless device and the base station are communicating via an NTN.

An UL signal may be the PUCCH for (or corresponding to or conveying) the (positive) SR. The UL signal may convey (or be for sending/transmitting) a downlink (DL) hybrid automatic repeat request (HARQ) acknowledgement. The DL HARQ process may be a feedback-enabled DL HARQ process. The UL signal may convey (or be for sending/transmitting) a transport block (TB) corresponding to an UL HARQ process. A state/mode of the UL HARQ process may be a HARQ mode A.

A wireless device may keep skipping the PDCCH monitoring on the DL active BWP of the serving cell after the last/final/ending/latest symbol of a transmission/occasion of the UL signal for at most the wireless device-base station RTT (e.g., a round-trip transmission delay between the wireless device and the base station corresponding to the serving cell) if the serving cell is part of the NTN. The wireless device may skip the PDCCH monitoring on the DL active BWP of the serving cell for a second time duration after the sending (e.g., transmitting) occasion/time of the UL signal. The wireless device may determine the second time duration based on the time duration and the wireless device-base station RTT. The second time duration may be a minimum of the wireless device-base station RTT and a third time duration, wherein the third time duration may be equal to a subtraction of a fourth time duration from the time duration. The fourth time duration may be a time difference between the transmitting occasion/time of the UL signal and a reception time/occasion of the DCI. The wireless device may refrain from resuming (or not resume or prevent resuming) the PDCCH monitoring on the DL active BWP of the serving cell in response to the transmitting the UL signal (e.g., for the at most the UE-gNB RTT after the transmission time/occasion of the UL signal) if the serving cell is part of the NTN and the DRX operation is configured (e.g., via the one or more DRX configuration parameters) for the serving cell.

Figure 20:
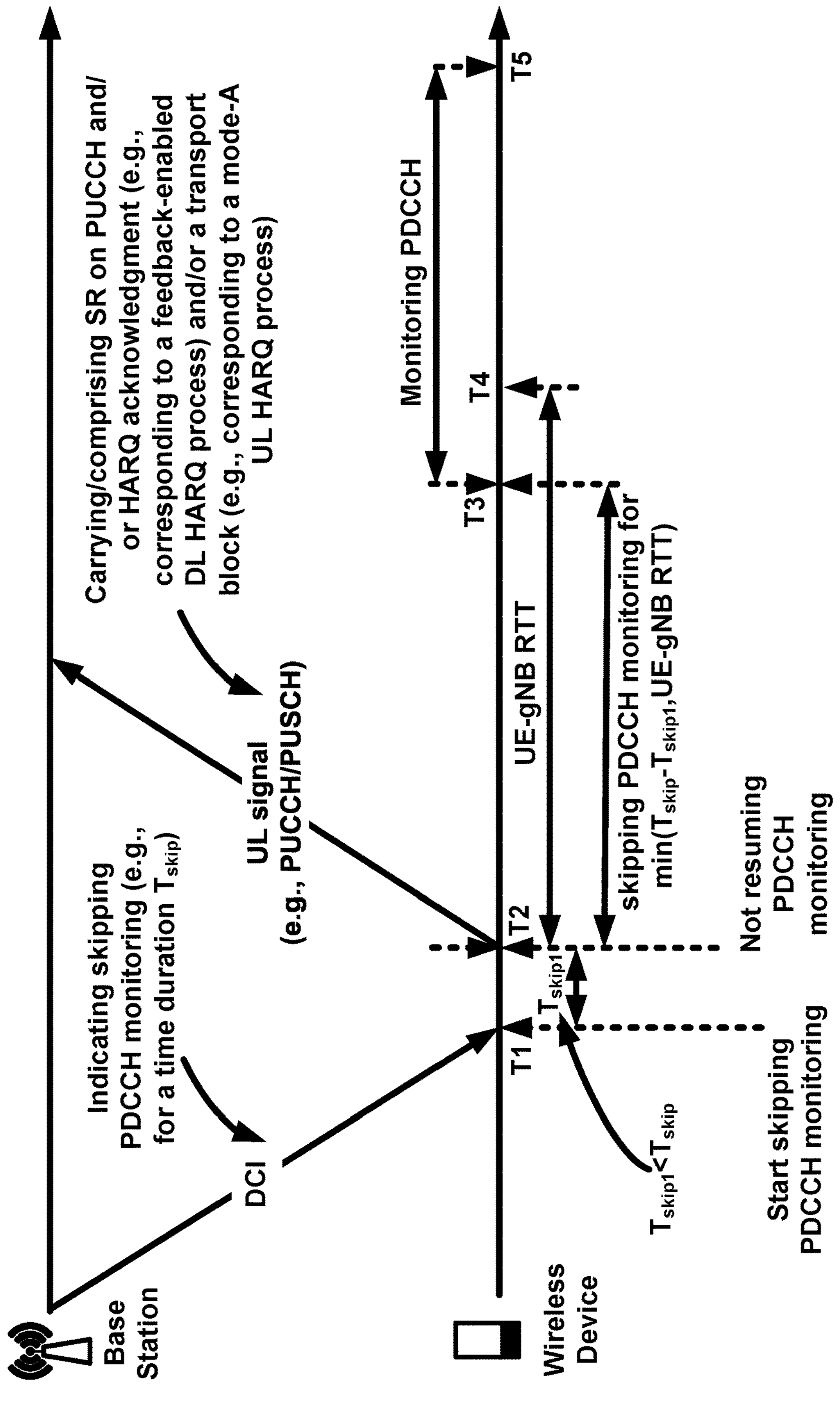
FIG. 20 shows an example of a PDCCH monitoring procedure in wireless communications systems.

FIG. 20 shows an example of a PDCCH monitoring procedure in wireless communications systems per an aspect of the present disclosure. FIG. 20 may show an example of a procedure for determining whether to skip the PDCCH monitoring or not. For example, the wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

A wireless device may, for example, communicate with the base station via a non-terrestrial network (NTN), e.g., the wireless device and the base station may operate in the NTN and/or the base station may be an NTN base station and/or a cell (e.g., a serving cell and/or a Serving Cell of one or more Serving Cells) may be part of the NTN. For example, the cell may be a Serving Cell or a non-Serving Cell.

A wireless device may, from the base station, receive the one or more configuration parameters (e.g., the one or more RRC configuration parameters). The one or more configuration parameters may comprise one or more serving cell (e.g., the one or more Serving Cells or the one or more cells) configuration parameters (e.g., ServingCellConfigCommon, ServingCellConfigCommonSIB, and/or ServingCellConfig)

for configuring one or more cells (e.g., one or more serving cells, e.g., the one or more Serving Cells). The one or more cells may comprise a master (or primary) cell group (MSG) and/or a secondary cell group (SCG). A cell of the one or more cells may be a primary secondary cell (PSCell), or a primary cell (PCell), or a secondary cell (SCell), or a special cell (SpCell). A cell of the one or more cells may belong to a first cell group corresponding to a primary timing advance group (pTAG) or a second cell group corresponding to a secondary timing advance group (sTAG). The one or more configuration parameters may configure the wireless device for multi-cell communication and/or carrier aggregation (CA). The one or more configuration parameters may comprise one or more BWP configuration parameters.

One or more configuration parameters may comprise the one or more NTN configuration parameters. The wireless device may receive the one or more NTN configuration parameters by acquiring SIB1 and/or the NTN-specific SIB (e.g., SIB19). The one or more NTN configuration parameters may comprise the plurality of the NTN-specific configuration parameters.

One the one or more NTN configuration parameters may comprise a plurality of NTN-specific configuration parameters (e.g., ntn-Config), e.g., one or more NTN-specific configuration parameters. The one the one or more NTN configuration parameters may comprise the one or more ephemeris parameters (e.g., the satellite ephemeris data and/or at least one satellite ephemeris data/information), and/or the one or more common delay/TA parameters (e.g., at least one common TA/delay parameter) and/or a reference location (e.g., referenceLocation) and/or antenna polarization mode(s) (e.g., vertical horizontal, right-hand circular, or left-hand circular) of at least one NTN node/payload. The base station may communicate with the wireless device via the at least one NTN node/payload (e.g., via at least one service link).

A first NTN-specific configuration parameters of the plurality of the NTN-specific configuration parameters (or the one or more NTN configuration parameters) may correspond to a first Serving Cell of the one or more Serving Cells (e.g., NTN-Config-r17 IE of the NTN-specific SIB). The first Serving Cell may be the serving cell. The one or more NTN configuration parameters may comprise one or more second NTN-specific configuration parameters corresponding to one or more NTN neighbour cells (e.g., NTN-Config-r17 IE of ntn-NeighCellConfigList IE of the NTN-specific SIB). An NTN neighbour cell of the one or more NTN neighbour cells may be one of the one or more Serving Cells (e.g., the serving cell). An NTN neighbour cell of the one or more NTN neighbour cells may not be one of the one or more Serving Cells (e.g., may be a non-Serving Cell). In some examples, an NTN neighbour cell of the one or more NTN neighbour cells may correspond to a physical cell ID (e.g., PhysCellId) and/or a carrier frequency.

A cell (e.g., the serving cell) of the one or more cells may be the (first) serving cell or a cell of the one or more NTN neighbour cells. The cell may comprise one or more NTN nodes and/or one or more service links (e.g., for communicating with the wireless device). The cell (e.g., the serving cell) may comprise one or more second cells (e.g., each cell of the one or more second cells may correspond to each of one or more service links or the one or more NTN nodes). The one or more second cells may correspond to the SCG.

An NTN-specific configuration parameter of the plurality of the NTN-specific configuration parameters (e.g., the first NTN-specific configuration parameters or a second NTN-specific configuration parameters of the one or more second NTN-specific configuration parameters) may comprise one or more corresponding ephemeris parameters (e.g., corresponding satellite ephemeris data, e.g., ephemerisInfo), and/or the one or more corresponding common delay/TA parameters (e.g., ta-Info) and/or one or more corresponding antenna polarization mode(s) (e.g., vertical horizontal, right-hand circular, or left-hand circular) for UL/DL communications on a corresponding service link (or a corresponding serving cell).

A serving cell corresponding to an NTN-specific configuration parameters of the plurality of the NTN-specific configuration parameters may comprise a single NTN node/payload. The one or more corresponding ephemeris parameters (e.g., corresponding satellite ephemeris data, e.g., ephemerisInfo), and/or the one or more corresponding common delay/TA parameters (e.g., ta-Info) and/or the one or more corresponding antenna polarization mode(s) (e.g., vertical horizontal, right-hand circular, or left-hand circular) may correspond to a service link corresponding to the single NTN node.

A serving cell corresponding to an NTN-specific configuration parameters of the plurality of the NTN-specific configuration parameters may comprise one or more NTN nodes/payloads. The one or more corresponding ephemeris parameters (e.g., corresponding satellite ephemeris data, e.g., ephemerisInfo), and/or the one or more corresponding common delay/TA parameters (e.g., ta-Info) and/or the one or more corresponding antenna polarization mode(s) (e.g., vertical horizontal, right-hand circular, or left-hand circular) may correspond to one or more service links corresponding to the one or more NTN nodes/payloads.

A wireless device may determine at least one common TA/delay using/based on the one or more common TA parameters of the plurality of NTN-specific configuration parameters. Each common TA/delay of the at least one common TA/delay may correspond to a timing advance group (TAG) and/or a serving cell of the one or more Serving Cells and/or an NTN node of the one or more NTN nodes. The at least one common TA/delay may correspond to one or more TAGs (e.g., a primary TAG or a secondary TAG). A common TA/delay of the at least one common TA/delay may correspond to a serving cell (e.g., of the one or more Serving Cells) and/or a non-Serving Cell (e.g., of the one or more non-Serving Cells). A common TA/delay of at least one common TA/delay may correspond to a feeder link of a serving cell or a feeder link of a non-Serving Cell. The wireless device may determine a common TA/delay of at least one common TA/delay based on one or more common TA parameters of a corresponding NTN-specific configuration parameters of the plurality of the NTN-specific configuration parameters.

A wireless device may determine at least one service link delay using/based on the one or more ephemeris parameters of the plurality of NTN-specific configuration parameters. Each service link delay of the at least one service link delay may correspond to a TAG and/or a serving cell of the one or more Serving Cells and/or an NTN node of the one or more NTN nodes. The at least one service link delay may correspond to one or more TAGs (e.g., a primary TAG or a secondary TAG). A common TA/delay of the at least one service link delay may correspond to a serving cell (e.g., of the one or more Serving Cells) and/or a non-Serving Cell (e.g., of one or more non-Serving Cells). A service link delay of at least one service link delay may correspond to a service link of a serving cell or a service link of a non-Serving Cell. The wireless device may determine a service link delay of at least one service link delay based on one or more ephemeris parameters of a corresponding NTN-specific configuration parameters of the plurality of the NTN-specific configuration parameters.

A wireless device may determine at least one open-loop TA (e.g., each open-loop TA of the at least one open-loop TA may correspond to a TAG or a serving cell of the one or more Serving Cells and/or an NTN node of the one or more NTN nodes) using/based on the plurality of NTN-specific configuration parameters. The at least one open-loop TA may correspond to one or more TAGs (e.g., a primary TAG or a secondary TAG). An open-loop TA of the at least one open-loop TA may correspond to a serving cell (e.g., of the one or more Serving Cells) and/or a non-Serving Cell (e.g., of one or more non-Serving Cells). An open-loop TA of at least one open-loop TA may correspond to an NTN node of the at least one NTN node. The wireless device may determine/obtain/calculate/estimate an open-loop TA of at least one open-loop TA based on a corresponding common TA/delay and/or a corresponding service link delay. The wireless device may, corresponding to an open-loop TA of at least one open-loop TA, determine a wireless device-base station RTT (e.g., corresponding to a serving cell).

A wireless device may determine/maintain/calculate at least one TA value (e.g., each TA value of the at least one TA value may correspond to a TAG or a serving cell of the one or more Serving Cells) using/based on the at least one open-loop TA and/or one or more TAC MAC CEs. The one or more TAC MAC CEs may be received, by the wireless device, from the one or more Serving Cells or a serving cell or the at least one Serving Cell. A first (or each) TAC MAC CE of the one or more TAC MAC CEs may comprise a first TA fix/correction/update (or a first TA value) and at least one first index/ID. The at least one first index/ID may be one of the following: a first TAG ID, and/or a first cell ID, and/or a first beam ID, and/or a first NTN node ID/index, and/or the like. Based on receiving the first TAC MAC CE of the one or more TAC MAC CEs, the wireless device may calculate/maintain/update/determine a TA value of the at least one TA value corresponding to the indicated the at least one first TAG ID. The at least one TA value may correspond to one or more TAGs (e.g., a primary TAG or a secondary TAG). A TA value of the at least one TA value may correspond to a serving cell (e.g., the one or more Serving Cells) and/or a non-serving cell (e.g., of one or more non-Serving Cells). In some examples, a TA value of at least one TA value may correspond to an NTN node of the at least one NTN node.

A wireless device may determine at least one wireless device-base station round trip transmission delay (RTT) (e.g., each UE-gNB RTT of the at least one UE-gNB RTT may correspond to a TAG or a serving cell of the one or more serving cells) using/based on the plurality of NTN-specific configuration parameters. The at least one wireless device-base station RTT may correspond to one or more TAGs (e.g., a primary TAG or a secondary TAG). A wireless device-base station RTT of the at least one wireless device-base station RTT may correspond to a serving cell (e.g., of the one or more serving cells) and/or a non-serving cell (e.g., of one or more non-serving Cells). A wireless device-base station RTT of at least one wireless device-base station RTT may correspond to an NTN node of the at least one NTN node. The wireless device may determine/estimate/calculate a wireless device-base station RTT of at least one wireless device-base station RTT based on a corresponding open-loop TA (a corresponding TA value) and/or a corresponding MAC-layer timing offset (e.g., K-Mac). In some examples, the wireless device may determine a wireless device-base station RTT of the at least one wireless device-base station RTT based on (e.g., by summing) the corresponding open-loop TA value (or a corresponding TA value) of the at least one open-loop TA value (e.g., in ms/slots/symbols/subframes) and a corresponding MAC-layer timing offset (e.g., K-Mac) (e.g., in ms/slots/symbols/subframes).

Each NTN-specific configuration parameter of the plurality of NTN-specific configuration parameters may comprise an MAC-layer timing offset (e.g., K-Mac or Kmac), e.g., corresponding to a feeder link and/or an NTN node and/or a serving cell and/or a non-serving cell, or the like. The one or more NTN configuration parameters may indicate one or more MAC-layer timing offsets corresponding to the one or more feeder links and/or the one or more Serving Cells. The one or more NTN configuration parameters may indicate a first MAC-layer timing offset of the one or more MAC-layer timing offsets corresponding to the primary TAG. The one or more NTN configuration parameters may indicate a second MAC-layer timing offset of the one or more MAC-layer timing offsets corresponding to the secondary TAG.

One or more NTN configuration parameters may indicate a first MAC-layer timing offset of the one or more MAC-layer timing offsets corresponding to the primary TAG or a first cell group (e.g., the MSG). The one or more NTN configuration parameters may indicate a second MAC-layer timing offset of the one or more MAC-layer timing offsets corresponding to the secondary TAG and/or a second cell group (e.g., the SCG).

Each NTN-specific configuration parameter of the plurality of NTN-specific configuration parameters may comprise a cell-specific timing offset (e.g., CellSpecific_K_offset), e.g., corresponding to a serving cell or a TAG or a service link of the serving cell or an NTN node of the serving cell, or the like. The one or more NTN configuration parameters may indicate one or more (or at least one) cell-specific timing offsets corresponding to the one or more service links and/or one or more NTN nodes/payloads and/or the one or more cells (e.g., the one or more Serving Cells). The base station may determine/estimate/calculate the cell-specific timing offset (e.g., CellSpecific_K_offset), e.g., corresponding to the serving cell or the TAG or the service link of the serving cell or the NTN node of the serving cell, based on a maximum propagation delay of a cell (e.g., the serving cell or the TAG or the service link of the serving cell or the NTN node of the serving cell).

One or more NTN configuration parameters may indicate a first cell-specific timing offset of the one or more cell-specific timing offsets corresponding to the primary TAG or a first cell group (e.g., the MSG). The one or more NTN configuration parameters may indicate a second cell-specific timing offset of the one or more cell-specific timing offsets corresponding to the secondary TAG and/or a second cell group (e.g., the SCG).

A wireless device may use the one or more NTN configuration parameters to determine/measure/calculate/maintain/update/estimate the at least one open-loop TA value of the wireless device and/or the at least one common TA/delay and/or the at least one service link delay and/or the at least one wireless device-base station RTT and/or at least one TA value. Each TA value of the at least one TA value (and/or each open-loop TA value of the at least one open-loop TA value and/or each cell-specific timing offset of the at least one cell-specific timing offset and/or each MAC-layer timing offset of the at least one MAC-layer timing offset) may correspond to a serving cell and/or a service link and/or a TAG and/or an NTN node and/or a feeder link, and/or the like.

A wireless device may, based on the one or more NTN configuration parameters, determine/measure/maintain one or more NTN-specific parameters/values. The one or more NTN-specific parameters/values (and/or the one or more NTN configuration parameters) may comprise a type of NTN payload (e.g., a geostationary (GEO) satellite, a medium earth orbit (MEO) satellite, a low Earth orbit (LEO) satellite, and/or a high altitude platform station (HAPS)) corresponding to the at least one serving cell. The one or more NTN-specific parameters/values (and/or the one or more NTN configuration parameters) may comprise a type of the cell/beam (e.g., an Earth-fixed cell/beam or an Earth-moving cell/beam) corresponding to the at least one serving cell or one or more non-serving cells. The wireless device may determine at least one location information (or position) of the at least one NTN node/payload based on the one or more NTN configuration parameters and/or the one or more NTN-specific parameters/values. The wireless device may use the one or more NTN configuration parameters (e.g., the one or more ephemeris parameters and/or the one or more common delay/TA parameters and/or referenceLocation) to calculate/determine/maintain/update the at least one location information of the at least one NTN node/payload (e.g., satellite). The wireless device may maintain/obtain UL synchronization of the one or more cells in response to acquiring/reacquiring the NTN-specific SIB and/or SIB1 (e.g., receiving the one or more NTN configuration parameters). The wireless device may determine whether UL synchronization of a first cell (e.g., a serving cell) of the one or more cells and/or a second cell of the one or more cells being lost or not.

A wireless device may determine the UL synchronization of the second cell of the one or more cells being obtained/maintained based on (e.g. in response to) obtaining the UL synchronization of the first cell of the one or more cells (e.g., based on receiving the one or more NTN configuration parameters or receiving the one or more NTN configuration parameters corresponding to the first cell). The wireless device may determine the UL synchronization of the second cell of the one or more cells being lost for losing the UL synchronization of the first cell of the one or more cells. For example, the first cell may correspond to the primary TAG. The first cell may be the cell that the wireless device is receiving the NTN-specific SIB and/or SIB1. The first cell may be a PCell and/or be a cell of the MSG. The wireless device may determine the UL synchronization of the second cell being lost based on a validity timer of the first cell being expired. The wireless device may determine the UL synchronization of the second cell being obtained based on the validity timer of the first cell being running.

A wireless device may obtain/maintain UL synchronization of the second cell independently from the UL synchronization of the first cell. The wireless device may not determine the UL synchronization of the second cell being lost for the UL synchronization of the first cell being lost. The wireless device may not determine the UL synchronization of the second cell being obtained in response to the UL synchronization of the first cell being obtained. The wireless device may determine the UL synchronization of the second cell being lost based on a validity timer of the second cell being expired. The wireless device may, for example, determine the UL synchronization of the second cell being obtained based on the validity timer of the second cell being running.

An NTN-specific configuration parameters of the plurality of the NTN-specific configuration parameters may comprise a duration ntn-UlSyncValidityDuration and/or an epochTime. The wireless device may start/restart at least one validity timer/window/period/duration (e.g., with the duration UlSyncValidityDuration) based on acquiring/reacquiring the NTN-specific SIB and/or SIB1 (e.g., receiving the one or more NTN configuration parameters). A validity timer (e.g., T430 timer) of the at least one validity timer may correspond to a cell (e.g., the Serving Cell or an NTN neighbour cell) of the one or more cells and/or a TAG (e.g., the primary TAG or the secondary TAG) and/or a service link of the at least one service link and/or an NTN node or the at least one NTN node and/or a cell group (e.g., the PCG or SCG).

A wireless device in the RRC inactive/idle state may start/restart a (each) validity timer (e.g., corresponding to a cell of the one or more cells, e.g., a Serving Cell of the one or more serving cells, and/or TAG and/or a service link and/or a cell group) in response to receiving the one or more NTN configuration parameters, e.g., an NTN-specific configuration parameters corresponding to the cell (e.g., the serving cell) and/or TAG and/or a service link and/or a cell group. The wireless device may start/restart the validity timer (e.g., of the serving cell) with a duration ntn-UlSyncValidityDuration of the corresponding NTN-specific configuration parameters from a subframe indicated by an epochTime of the corresponding NTN-specific configuration parameters. The wireless device may determine the epochTime based on a subframe that the corresponding NTN-specific configuration parameters (and/or the NTN-specific SIB or SIB1) is received/acquired and/or a system information (SI) modification window and/or an SFN. The wireless device may require (or attempt to re-acquire) the NTN-specific SIB (e.g., SIB19) and/or SIB1 before expiry of a validity timer of the at least one validity timer (e.g., before an end of the duration indicated by ntn-UlSyncValidityDuration of the NTN-specific configuration parameters of the corresponding serving cell).

A wireless device may determine UL synchronization of each serving cell (e.g., a serving cell) of the one or more serving cells being lost (e.g., the wireless device may stop the at least one validity timer, if running) if a validity timer of the at least one validity timer (e.g., corresponding to a serving cell of the one or more serving cells and/or a non-serving cell) is expired. The wireless device may (re)-acquire the NTN-specific SIB and/or SIB1. Based on the validity timer corresponding to a cell of the one or more cells (e.g., a PCell or a cell in the pTAG or a cell in MCG or a PsCell) being expired, the wireless device may determine UL synchronization of each serving cell of the one or more serving cells being lost (e.g., the wireless device may stop the at least one validity timer, if running).

A wireless device may determine UL synchronization of the serving cell of the one or more serving cells being lost if a validity timer of the at least one validity timer (e.g., corresponding to a serving cell of the one or more serving cells) is expired. The wireless device may (re)-acquire the NTN-specific SIB and/or SIB1.

A wireless device may run/maintain/start/restart a validity timer/window/duration corresponding to each open-loop TA value of the at least one TA value (or a TAG or a serving cell of the one or more service cells). The wireless device may determine UL synchronization of the corresponding Serving Cell (or each Serving Cell of the one or more Serving Cells or a corresponding non-Serving Cell) being lost if a validity timer corresponding to a TAG or a Serving Cell is expired. The wireless device may (re)-acquire the NTN-specific SIB and/or SIB1 and/or corresponding NTN-specific configuration parameters.

A wireless device may send (e.g., transmit) a wireless-device-capability message to the base station. The wireless-device-capability message may indicate a capability of the wireless device for (simultaneously) maintaining/estimating/updating/measuring/calculating the at least one open-loop TA value of the wireless device (and/or the at least one UE-gNB RTT). The wireless-device-capability message may indicate a capability of the wireless device for maintaining (e.g., running, starting, restarting) the at least one validity timer corresponding to the one or more serving cells (e.g., comprising the serving cell and the one or more NTN neighbour cells). The wireless-device-capability message may indicate a capability of the wireless device for maintaining (e.g., running, starting, restarting) a single validity timer corresponding to all serving cells (e.g., comprising the serving cell and the one or more NTN neighbour cells).

A wireless-device-capability message may indicate a capability of the wireless device for simultaneously communicating to the base station via the at least one NTN node/payload and/or at least one service link (and/or at least one feeder link). An NTN node of the at least one NTN node may correspond to a serving cell. An NTN node of the at least one NTN node may correspond to a non-serving cell. The at least one NTN node may correspond to different serving cells.

One or more configuration parameters (e.g., the one or more RRC configuration parameters) may comprise one or more BWP configuration parameters (e.g., BWP-DownlinkDedicated IE), e.g., of a downlink (DL) BWP (e.g., initial downlink BWP) of a serving cell and/or of an UL BWP of the serving cell. The one or more WBP configuration parameters (e.g., of the downlink BWP) may comprise: one or more PDCCH configuration parameters (e.g., for PDCCH of the downlink BWP, e.g., in pdcch-Config IE and/or PDCCH-ServingCellConfig IE applicable for all downlink BWPs of the serving cell), and one or more other parameters. the one or more PDCCH configuration parameters may configure the wireless device with UE-specific PDCCH parameters or MBS multicast PDCCH parameters, e.g., control resource sets (CORESET), search spaces and additional parameters for acquiring PDCCH.

One or more PDCCH configuration parameters may comprise a set of durations (e.g., by PDCCHSkippingDurationList). The set of durations (or windows) may comprise at least one time duration. The PDCCHSkippingDurationList may indicate one or more skipping values corresponding to skipping duration in unit of slots (or symbols or ms). For the 15 kHz sub carrier spacing (SCS), for each value of the one or more skipping values, only a first 26 skipping values may be valid and may correspond to {1, 2, 3, . . . , 20, 30, 40, 50, 60, 80, 100} slots (or symbols or ms). For the 30 kHz SCS, for each value of the one or more skipping values, only a first 46 skipping values may be valid and may correspond to {1, 2, 3, . . . , 40, 60, 80, 100, 120, 160, 200} slots (or symbols or ms). For the 60 kHz SCS, for each value of the one or more skipping values, only the first 86 skipping values may be valid and may correspond to {1, 2, 3, . . . , 80, 120, 160, 200, 240, 320, 400}. For the 120 kHz SCS, for each value of the one or more skipping values, the 166 skipping values may correspond to {1, 2, 3, . . . , 160, 240, 320, 400, 480, 640, 800} slots (or symbols or ms). For the 480 kHz SCS, for each value of the one or more skipping values, the 166 skipping values may correspond to {4, 8, 12, . . . , 640, 960, 1280, 1600, 1920, 2560, 3200}. For the 960 kHz SCS, for each value of the one or more skipping values, the 166 values may correspond to {8, 16, 24, . . . , 1280, 1920, 2560, 3200, 3840, 5120, 6400} slots (or symbols or ms).

As shown in FIG. 20, a wireless device may receive (e.g., from the base station on a DL (active) BWP of the serving cell) a DCI at time/occasion/interval T1. For example, T1 in FIG. 20 may indicate a last/final/ending/latest symbol of a reception time/occasion/resource of the DCI. The DCI may indicate skipping PDCCH (e.g., skipping/stopping/avoiding monitoring PDCCH or skipping/stopping/avoiding monitoring control channels, and/or skipping/stopping/avoiding monitoring PDCCH candidates), e.g., within/during/for a time window/duration (e.g., $T_{skip}$ slots/symbols/milliseconds), e.g., on the DL BWP of the serving cell. A time value for (or a length of) the time window may be indicated by the DCI. The DCI may comprise a first filed with a plurality of bits (e.g., with a bit-width of 0, 1, or 2 bits). The first field may be a PDCCH skipping indication field (e.g., a 'PDCCH monitoring adaptation indication' field). A codepoint of the PDCCH skipping indication field may indicate a number of slots for the wireless device to skip monitoring the PDCCH. The wireless device may determine the time window (or the time value) from the 'PDCCH monitoring adaptation indication' field of the DCI and/or the one or more configuration parameters (e.g., PDCCHSkippingDurationList). The serving cell may be SpCell.

A set of durations may have cardinality of one (e.g., PDCCHSkippingDurationList may indicate one skipping value) if searchSpaceGroupldList-r17 is not configured by the one or more PDCCH configuration parameters. The bit-width of the PDCCH skipping indication field of the DCI may be 1 bit. The wireless device may determine the time window (e.g., $T_{skip}$ slots/symbols/milliseconds) being equal to the one skipping value indicated by the PDCCHSkippingDurationList. For example, the set of durations may have cardinality of larger than one (e.g., PDCCHSkippingDurationList may indicate more than one skipping value). The bit-width of the PDCCH skipping indication field of the DCI may be 2 bits. The wireless device may determine the time window (e.g., $T_{skip}$ slots/symbols/milliseconds) based on the field value of the PDCCH skipping indication field of the DCI, e.g., by selecting one skipping value from the more than one skipping value indicated by the PDCCHSkippingDurationList.

Bit-width of the PDCCH skipping indication field of the DCI may be 2 bits if searchSpaceGroupldList-r17 is configured by the one or more PDCCH configuration parameters. A '10' value for the bits of the PDCCH skipping indication field of the DCI may indicate skipping the PDCCH monitoring for a duration provided/indicated by a first skipping value in the set of durations (e.g., initial/starting time duration of the at least one time duration). A '11' value for the bits of the PDCCH skipping indication field of the DCI may indicate skipping the PDCCH monitoring for a duration provided/indicated by a second skipping value in the set of durations.

DCI may schedule/indicate transmission of UL/DL data (e.g., TBs and/or MAC PDUs). The DCI may be a non-scheduling DCI (e.g., not scheduling transmission of UL/DL data and/or scheduling transmission of dummy data).

As shown in FIG. 20, a wireless device may stop/skip/avoid monitoring PDCCH (candidates) on the DL (active) BWP, e.g., of the serving cell or a set of serving cells of the one or more serving cells for receiving the DCI. For example, the wireless device may, based on (e.g. in response to) the receiving the DCI, start skipping of PDCCH monitoring (e.g., stop/skip/avoid monitoring PDCCH) at a beginning/starting (or a first/initial/earliest symbol) of a first/earliest/starting/initial slot after the reception time/occasion of the DCI (e.g., a last/ending/final/latest symbol of a PDCCH reception providing/carrying the DCI). Stopping/skipping monitoring PDCCH on the DL (active) BWP of the serving cell may comprise stopping/skipping monitoring PDCCH on one or more search space set (SSS) groups configured on the BWP of the serving cell. During the time window (or during a timer associated with the time window running), the base station may not send (e.g., transmit) PDCCH to the wireless device.

As shown in FIG. 20, a wireless device may send (e.g., transmit) an UL signal/channel (e.g., a PUCCH providing/carrying the positive SR) at time/occasion T2 (e.g., to the base station) if the wireless device is skipping PDCCH monitoring (e.g., prior to an expiry of the time window of ongoing PDCCH skipping or an expiry of the timer associated with the time window) on the DL (active) BWP of the serving cell. The time/occasion T2 may correspond to a last/final/ending/latest symbol of the UL signal. As shown in FIG. 20, the wireless device may keep skipping the PDCCH monitoring on the DL (active) BWP of the serving cell irrespective of (or in response to) the transmission of the UL signal. At time/occasion T2 in FIG. 20 (e.g., corresponding to the transmission of the UL signal), the wireless device may not resume monitoring the PDCCH.

As shown in FIG. 20, a wireless device may keep skipping the PDCCH monitoring on the DL active BWP of the serving cell after the last/final/ending/latest symbol of the transmission/occasion of the UL signal for at most the UE-gNB RTT (e.g., corresponding to the serving cell) if the serving cell is part of the NTN. The wireless device may skip the PDCCH monitoring on the DL active BWP of the serving cell for a second time duration after the transmitting occasion/time of the UL signal. The wireless device may determine the second time duration (e.g., min($T_{skip}-T_{skip1}$, UE-gNB RTT) slots/symbols/milliseconds in FIG. 20) based on the time duration (e.g., $T_{skip}$ slots/symbols/milliseconds) and the wireless device-base station RTT corresponding to the serving cell. The second time duration may be a minimum of the wireless device-base station RTT and a third time duration (e.g., $T_{skip}-T_{skip1}$ slots/symbols/milliseconds), wherein the third time duration is equal to a subtraction of a fourth time duration (e.g., $T_{skip1}$ slots/symbols/milliseconds) from the time duration. The fourth time duration may be a time difference between the transmitting occasion/time of the UL signal (e.g., time/occasion T2 in FIG. 20) and a reception time/occasion of the DCI (e.g., time/occasion T1 in FIG. 20). In the example of FIG. 20, $T_{skip}>T_{skip1}$. The wireless device may resume the PDCCH monitoring at time/occasion T4 in FIG. 20 if $T_{skip}-T_{skip1}>$UE-gNB RTT (e.g., $T_{skip}-T_{skip1}$ is larger than the UE-gNB RTT of the corresponding cell).

A wireless device may resume the PDCCH monitoring at time/occasion T3 in FIG. 20 if $T_{skip}-T_{skip1}<$UE-gNB RTT (e.g., $T_{skip}-T_{skip1}$ is smaller than the UE-gNB RTT of the corresponding cell). The wireless device may resume the PDCCH monitoring at time/occasion T4 (e.g., after the UE-gNB RTT slots/symbols/ms from the transmission time/occasion of the UL signal) in FIG. 20.

An UL signal may be a PUCCH for (or corresponding to or conveying/carrying) the (positive) SR (e.g., the wireless device may send/transmit the SR during the UL transmission time/occasion). The wireless device may trigger an SR (e.g., due to a triggered BSR, or beam failure recovery, or a TA reporting, or the like). PUCCH resource (for sending/transmitting the SR) may correspond to an SR configuration of the triggered SR. A SR counter (e.g., SR_COUNTER) corresponding to the triggered SR may be 0. The SR counter may be larger than 0. The wireless device may send (e.g., transmit) the SR over/during a number of slots, $$N_{PUCCH}^{repeat}.$$

The parameter $$N_{PUCCH}^{repeat}$$

may indicate repetitions of the PUCCH transmission over/during the number of slots. The wireless device may determine the repetitions of the PUCCH transmission based on parameter nrofSlots (e.g., a higher layer parameter $$N_{PUCCH}^{repeat})$$

indicated/configured by the one or more configuration parameters (e.g., PUCCH-Config). The wireless device may start/restart a SR prohibit timer (e.g., sr-ProhibitTimer) corresponding to the triggered SR for transmitting the SR. The wireless device may delay the start of the SR prohibit timer (e.g., sr-ProhibitTimer) by the UE-gNB RTT of the serving cell (e.g., when the wireless device communicates with the base station via an NTN node), e.g., at time T4 in FIG. 20. The wireless device may monitor the PDCCH for receiving (e.g., for receiving an UL grant, e.g., for transmission of a BSR and/or pending data), e.g., by resuming the PDCCH monitoring or cancelling/terminating the PDCCH skipping, if the SR prohibit timer is running. The wireless device may start the SR prohibit timer the UE-gNB RTT after a first/initial/earliest symbol after the last/ending/final/latest symbol of the PUCCH. The wireless device may start the SR prohibit timer the wireless device-base station RTT after a first/initial/earliest symbol after the last/ending/final/latest symbol of a first/initial/earliest repetition among/from the $$N_{PUCCH}^{repeat}$$

PUCCHs.

An UL signal (e.g., PUCCH/PUSCH) may carry (or be for transmitting) a downlink (DL) hybrid automatic repeat request (HARQ) acknowledgement corresponding to a DL HARQ process with a DL HARQ process ID/index/number. The wireless device may receive (e.g., prior to the transmission time/occasion of the UL signal) a first TB (or a first MAC PDU) associated with the DL HARQ process. The wireless device may transmit UCI comprising a negative HARQ acknowledgment (e.g., HARQ-NACK) corresponding/associated with the first TB/MAC PDU via the UL signal if the wireless device unsuccessfully decodes the first TB. The base station may schedule a transmission of the first TB (e.g., via a PDSCH or a PDSCH bundle) based on sending (e.g., transmitting) a first DCI to the wireless device. The first DCI may be the DCI. The first DCI may be different than the DCI. The wireless device may receive the first TB based on (or via/using) a DL SPS PDSCH or a DL SPS PDSCH bundle. The one or more configuration parameters (e.g., SPS-Config) may configure the wireless device for receiving the first TB via/using the DL SPS PDSCH or the DL SPS PDSCH bundle.

DL HARQ process may be a feedback enabled HARQ process. The one or more configuration parameters (e.g., PDSCH-ServingCellConfig) may configure the DL HARQ process as feedback-enabled (e.g., via downlinkHARQ-FeedbackDisabled).

An UL signal may carry (or be for transmitting) a second TB (or a second MAC PDU) via/using a PUSCH or a PUSCH bundle, by the wireless device to the base station, corresponding to an UL HARQ process with an UL HARQ process ID/index/number. The wireless device may receive a dynamic UL grant (e.g., prior to the transmission time/occasion of the UL signal) for sending (e.g., transmitting) the second TB (e.g., based on detecting/receiving a second DCI). The base station may send (e.g., transmit) the second DCI indicating/scheduling the dynamic UL grant. The second DCI may be the DCI. The second DCI may be different than the DCI. The wireless device may send (e.g., transmit) the second TB (or the MAC PDU) via/using a configured UL grant (e.g., a configured grant Type 1 or a configured grant Type 2). The one or more configuration parameters (e.g., ConfiguredGrantConfig) may configure the configured UL grant. The one or more configuration parameters (e.g., via uplinkHARQ-Mode in PUSCH-ServingCellConfig IE) may configure/indicate the UL HARQ process with a HARQ mode A (e.g., HARQmodeA). The wireless device may resume the PDCCH monitoring starting at the beginning/starting (e.g., first/initial symbol) of the first slot after the transmission time/occasion of the UL signal (e.g., the last/final/ending/latest symbol of the PUCCH transmission) if the serving cell is not part of the NTN.

Skipping PDCCH monitoring may improve the battery life of the wireless device by reducing consumed power of the wireless device (e.g., reducing consumed power for the PDCCH monitoring) if the wireless device and the base station are communicating via an NTN. By not unnecessarily resuming the PDCCH monitoring on the DL active BWP of the serving cell based on (e.g. in response to) the transmission of the UL signal, the wireless device may reduce consumed power for the PDCCH monitoring.

Figure 21:
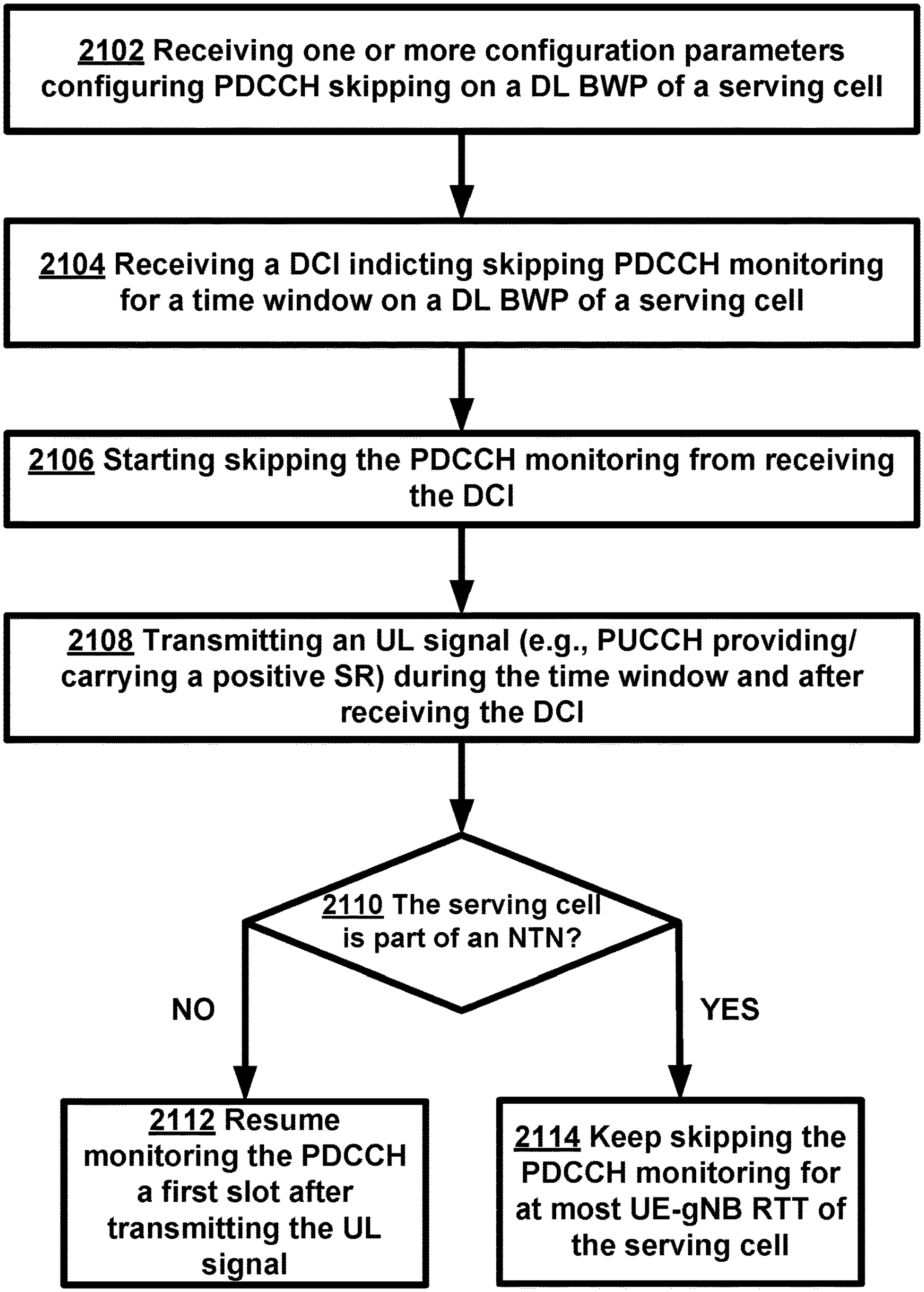
FIG. 21 shows a flowchart of an example method for improving the PDCCH monitoring in wireless communication systems.

FIG. 21 shows a flowchart of an example method for improving the PDCCH monitoring in wireless communication systems per an aspect of the present disclosure. The example method of the FIG. 21 may be used by a wireless device for determining whether to skip the PDCCH monitoring or not. The wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 21, a wireless device in step 2102 may receive, from a base station, one or more configuration parameters. The one or more configuration parameters may, for example, comprise the one or more serving cell (e.g., the one or more Serving Cells or the one or more cells) configuration parameters. The one or more configuration parameters may configure the wireless device for multi-cell communication and/or carrier aggregation (CA). The one or more configuration parameters comprise one or more BWP configuration parameters.

One or more configuration parameters may comprise the one or more PDCCH configuration parameters. The one or more PDCCH configuration parameters may configure the wireless device with the set of durations (e.g., by PDCCHSkippingDurationList) for the PDCCH skipping.

As shown in FIG. 21, a wireless device in step 2104 may receive (e.g., from the base station on a DL (active) BWP of the serving cell) the DCI indicating skipping PDCCH, e.g., within/during/for the time window/duration (e.g., $T_{skip}$ slots/symbols/milliseconds), e.g., on the DL BWP of the serving cell. As discussed above with FIG. 20, the DCI may comprise the PDCCH skipping indication field (e.g., a 'PDCCH monitoring adaptation indication' field) with a plurality of bits (e.g., with a bit-width of 0, 1, or 2 bits). The wireless device may determine the time window (or the time value) from the 'PDCCH monitoring adaptation indication' field of the DCI and/or the one or more configuration parameters (e.g., PDCCHSkippingDurationList).

As shown in FIG. 21, a wireless device in step 2106 may, based on (e.g. in response to) receiving the DCI, stop/skip/avoid monitoring PDCCH (candidates) on the DL (active) BWP, e.g., of the serving cell or a set of serving cells of the one or more serving cells. For example, based on (e.g. in response to) receiving the DCI, the wireless device may start skipping of PDCCH monitoring (e.g., stop/skip/avoid monitoring PDCCH) at a beginning/starting (or a first/initial/earliest symbol) of a first/earliest/starting/initial slot that is after the reception time/occasion of the DCI (e.g., a last/ending/final/latest symbol of a PDCCH reception providing/carrying the DCI).

As shown in FIG. 21, a wireless device in step 2108 may send (e.g. transmit) the UL signal/channel (e.g., the PUCCH providing/carrying the positive SR) to the base station if the wireless device is skipping PDCCH monitoring (e.g., prior to an expiry of the time window of ongoing PDCCH skipping) on the DL (active) BWP of the serving cell, As shown in FIG. 21, based on (e.g. in response to) the sending (e.g., transmitting) the UL signal during the time duration/window, a wireless device in step 2110 may determine whether to resume the PDCCH monitoring (e.g., stop skipping the PDCCH monitoring) on the DL (active) BWP of the serving cell or to keep skipping the PDCCH monitoring on the DL (active) BWP of the serving cell. To determine whether to resume the PDCCH monitoring (e.g., stop skipping the PDCCH monitoring) on the DL (active) BWP of the serving cell or to keep skipping the PDCCH monitoring on the DL (active) BWP of the serving cell, the wireless device may determine whether the serving cell is part of an NTN or not. The wireless device may determine whether the one or more NTN configuration parameters (e.g., corresponding to the serving cell) are available at the wireless device. The wireless device may determine whether communicating with the base station is via an NTN node or not. The wireless device may determine whether SIB19 is received from the base station via the serving cell. The wireless device may determine whether the one or more configuration parameters comprise a physical cell ID corresponding to the serving cell. In some other cases, the one or more configuration parameters may comprise an indication indicating whether the serving cell is part of the NTN or not.

As shown in FIG. 21, based on (e.g. in response to) the serving cell not being part of the NTN (e.g., the serving cell being part of a terrestrial network), a wireless device in step 2112 may resume the PDCCH monitoring based on the transmission of the UL signal. The wireless device may resume the PDCCH monitoring starting at the beginning/starting (e.g., first/initial symbol) of the first slot that is after the transmission time/occasion of the UL signal (e.g., the last/final/ending/latest symbol of the PUCCH transmission).

As shown in FIG. 21, based on (e.g. in response to) the serving cell being part of the NTN (e.g., the serving cell not being part of a terrestrial network), a wireless device in step 2114 may avoid resuming (or not resume or refrain from resuming) the PDCCH monitoring based on the transmission of the UL signal. The wireless device may keep skipping the PDCCH monitoring on the DL active BWP of the serving cell after the last/final/ending/latest symbol of the transmission/occasion of the UL signal for at most the UE-gNB RTT (e.g., corresponding to the serving cell). The wireless device may skip the PDCCH monitoring on the DL active BWP of the serving cell for the second time duration after the transmitting occasion/time of the UL signal.

Example embodiments may allow the wireless device to properly determine whether to skip the PDCCH monitoring or resume the PDCCH monitoring (e.g., based on the transmission of the UL signal). Some example embodiments may improve the battery life of the wireless device by reducing consumed power of the wireless device (e.g., reducing consumed power for the PDCCH monitoring). By not unnecessarily resuming the PDCCH monitoring on the DL active BWP of the serving cell (e.g., when the serving cell is part of the NTN), the wireless device may reduce consumed power for the PDCCH monitoring.

Figure 22:
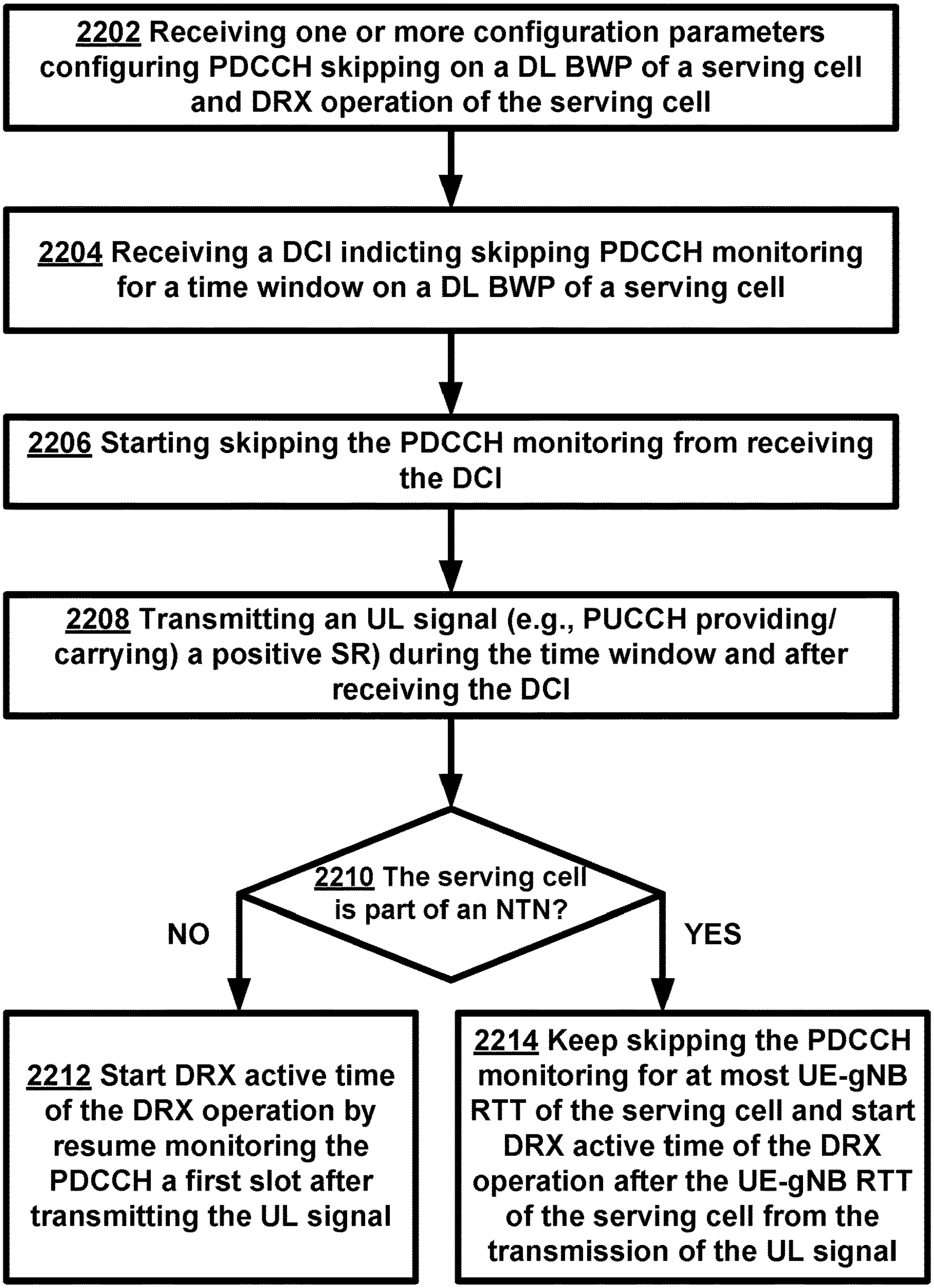
FIG. 22 shows a flowchart of an example method for improving the PDCCH monitoring in wireless communication systems.

FIG. 22 shows a flowchart of an example method for improving the PDCCH monitoring in wireless communication systems per an aspect of the present disclosure. The example method of the FIG. 22 may be used by a wireless device for determining whether to skip the PDCCH monitoring or not. The wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 22, a wireless device in step 2202 may receive, from the base station, the one or more configuration parameters. The one or more configuration parameters may comprise the one or more serving cell (e.g., the one or more serving cells or the one or more cells) configuration parameters. The one or more configuration parameters may configure the wireless device for multi-cell communication and/or carrier aggregation (CA). The one or more configuration parameters may comprise one or more BWP configuration parameters. The one or more configuration parameters may, for example, comprise the one or more DRX configuration parameters (e.g., corresponding to a serving cell of the one or more serving cells). The one or more configuration parameters may comprise the one or more PDCCH configuration parameters. The one or more PDCCH configuration parameters may configure the wireless device with the set of durations (e.g., by PDCCHSkippingDurationList) for the PDCCH skipping.

As shown in FIG. 22, a wireless device in step 2204 may receive (e.g., from the base station on a DL (active) BWP of the serving cell) the DCI indicating skipping PDCCH within/during/for the time window/duration (e.g., $T_{skip}$ slots/symbols/milliseconds) on the DL BWP of the serving cell. As discussed above with FIG. 20, the DCI may comprise the PDCCH skipping indication field (e.g., a 'PDCCH monitoring adaptation indication' field) with a plurality of bits (e.g., with a bit-width of 0, 1, or 2 bits). The wireless device may determine the time window (or the time value) from the 'PDCCH monitoring adaptation indication' field of the DCI and/or the one or more configuration parameters (e.g., PDCCHSkippingDurationList).

As shown in FIG. 22, based on (e.g. in response to) receiving the DCI, a wireless device in step 2206 may stop/skip/avoid monitoring PDCCH (candidates) on the DL (active) BWP of the serving cell or a set of serving cells of the one or more serving cells. For example, based on the receiving the DCI, the wireless device may start skipping of PDCCH monitoring (e.g., stop/skip/avoid monitoring PDCCH) at a beginning/starting (or a first/initial/earliest symbol) of a first/earliest/starting/initial slot after the reception time/occasion of the DCI (e.g., a last/ending/final/latest symbol of a PDCCH reception providing/carrying the DCI). The wireless device may be in a DRX active time of the DRX operation (e.g., a drx-onDurationTimer and/or a drx-InactivityTimer is running) if the wireless device receives the DCI. As shown in FIG. 22, the wireless device in step 2208 may send (e.g. transmit) the UL signal/channel (e.g., the PUCCH providing/carrying the positive SR) to the base station if the wireless device is skipping PDCCH monitoring (e.g., prior to an expiry of the time window of ongoing PDCCH skipping) on the DL (active) BWP of the serving cell.

As shown in FIG. 22, based on (e.g. in response to) the sending (e.g. transmitting) the UL signal during the time duration/window, a wireless device in step 2210 may determine whether to resume the PDCCH monitoring (e.g., stop skipping the PDCCH monitoring) on the DL (active) BWP of the serving cell or to keep skipping the PDCCH monitoring on the DL (active) BWP of the serving cell. To determine whether to resume the PDCCH monitoring (e.g., stop skipping the PDCCH monitoring) on the DL (active) BWP of the serving cell or to keep skipping the PDCCH monitoring on the DL (active) BWP of the serving cell, the wireless device may determine whether the serving cell is part of an NTN or not.

As shown in FIG. 22, based on (e.g. in response to) the serving cell not being part of the NTN (e.g., the serving cell being part of a terrestrial network), a wireless device in step 2212 may resume the PDCCH monitoring based on the transmission of the UL signal. The wireless device may resume the PDCCH monitoring starting at the beginning/starting (e.g., first/initial symbol) of the first slot after the transmission time/occasion of the UL signal (e.g., the last/final/ending/latest symbol of the PUCCH transmission). The wireless device may transit to a DRX active time of the DRX operation based on (e.g. in response to) the transmission of the UL signal. Based on (e.g., in response to) sending (e.g., transmitting) the SR on PUCCH, the wireless device may be in the active time of the DRX operation when/during the SR prohibit timer is running. The wireless device may start the SR prohibit timer based on (e.g., in response to) the transmitting/sending the SR. Based on (e.g., in response to) sending (e.g., transmitting) the HARQ-NACK corresponding to the DL HARQ process, the wireless device may be in the DRX active time of the DRX operation when/during a drx-RetransmissionTimerDL corresponding to (or for) the DL HARQ process is running. The wireless device may start the drx-RetransmissionTimerDL corresponding to (or for) the DL HARQ process after an expiry of a drx-HARQ-RTT-TimerDL corresponding to (or for) the DL HARQ process and based on unsuccessfully decoding the first TB/MAC PDU. The wireless device may monitor the PDCCH (e.g., by resuming the PDCCH monitoring or cancelling/terminating the PDCCH skipping) for receiving a third DCI scheduling retransmission of the first TB corresponding to the DL HARQ process if the drx-RetransmissionTimerDL corresponding to (or for) the DL HARQ process is running. Based on (e.g., in response to) sending (e.g., transmitting) the second TB corresponding to the UL HARQ process, the wireless device may be in the DRX active time of the DRX operation when/during a drx-RetransmissionTimerUL corresponding to (or for) the UL HARQ process is running. The wireless device may start the drx-RetransmissionTimerUL corresponding to (or for) the UL HARQ process after an expiry of a drx-HARQ-RTT-TimerUL corresponding to (or for) the UL HARQ process. The wireless device may monitor the PDCCH (e.g., by resuming the PDCCH monitoring or cancelling/terminating the PDCCH skipping) for receiving a fourth DCI scheduling retransmission of the second TB corresponding to the UL HARQ process if the drx-RetransmissionTimerUL corresponding to (or for) the UL HARQ process is running.

As shown in FIG. 22, based on (e.g., in response to) the serving cell being part of the NTN (e.g., the serving cell not being part of a terrestrial network), a wireless device in step 2214 may avoid resuming (or not resume or refrain from resuming) the PDCCH monitoring based on the transmission of the UL signal. The wireless device may keep skipping the PDCCH monitoring on the DL active BWP of the serving cell after the last/final/ending/latest symbol of the transmission/occasion of the UL signal for at most the UE-gNB RTT (e.g., corresponding to the serving cell) if the serving cell is part of the NTN. The wireless device may skip the PDCCH monitoring on the DL active BWP of the serving cell for the second time duration after the sending (e.g., transmitting) occasion/time of the UL signal. The wireless device may transit/switch to the DRX active time of the DRX operation after the wireless device-base station RTT (of the serving cell) from the transmission of the SR on PUCCH. Based on (e.g., in response to) sending (e.g., transmitting) the SR on PUCCH (e.g., when the corresponding SR_COUNTER=0), the wireless device may delay transiting/switching to the DRX active time of the DRX operation by the wireless device-base station RTT (of the serving cell) from the transmission of the SR on PUCCH (e.g., the wireless device may delay starting the SR prohibit timer by the wireless device-base station RTT (of the serving cell) from the transmission of the SR on PUCCH). Based on (e.g., in response to) sending (e.g., transmitting) the HARQ-NACK corresponding to the DL HARQ process (e.g., if DL HARQ process is a feedback enabled HARQ process), the wireless device may transit/switch to the DRX active time of the DRX operation after the wireless device-base station RTT (of the serving cell) from the transmission of the HARQ-NACK. The wireless device may delay starting the drx-RetransmissionTimerDL corresponding to (or for) the DL HARQ process after the wireless device-base station RTT (of the serving cell) from the transmission of the HARQ-NACK. The wireless device may start the drx-RetransmissionTimerDL corresponding to (or for) the DL HARQ process after an expiry of a drx-HARQ-RTT-TimerDL-NTN corresponding to (or for) the DL HARQ process and based on unsuccessfully decoding the first TB/MAC PDU. The wireless device may monitor the PDCCH (e.g., by resuming the PDCCH monitoring or cancelling/terminating the PDCCH skipping) for receiving a third DCI scheduling retransmission of the first TB corresponding to the DL HARQ process if the drx-RetransmissionTimerDL corresponding to (or for) the DL HARQ process is running. Based on (e.g., in response to) sending (e.g., transmitting) the second TB corresponding to the UL HARQ process (e.g., if mode/state of the UL HARQ process is the HARQmodeA), the wireless device may transit/switch to the DRX active time of the DRX operation after the UE-gNB RTT (of the serving cell) from the transmission of the second TB. The wireless device may delay starting the drx-RetransmissionTimerUL corresponding to (or for) the UL HARQ process by the wireless device-base station RTT (of the serving cell) from the transmission of the second TB. The wireless device may start the drx-RetransmissionTimerUL corresponding to (or for) the UL HARQ process after an expiry of a drx-HARQ-RTT-TimerUL-NTN corresponding to (or for) the UL HARQ process. The wireless device may monitor the PDCCH (e.g., by resuming the PDCCH monitoring or cancelling/terminating the PDCCH skipping) for receiving a fourth DCI scheduling retransmission of the second TB corresponding to the UL HARQ process if the drx-RetransmissionTimerUL corresponding to (or for) the UL HARQ process is running.

Examples described herein may allow the wireless device to properly determine whether to skip the PDCCH monitoring or resume the PDCCH monitoring (e.g., based on (in response to) the transmission of the UL signal). Some example embodiments may improve the battery life of the wireless device by reducing consumed power of the wireless device (e.g., reducing consumed power for the PDCCH monitoring). By not unnecessarily resuming the PDCCH monitoring on the DL active BWP of the serving cell (e.g., when the serving cell is part of the NTN), the wireless device may reduce consumed power for the PDCCH monitoring.

Figure 23:
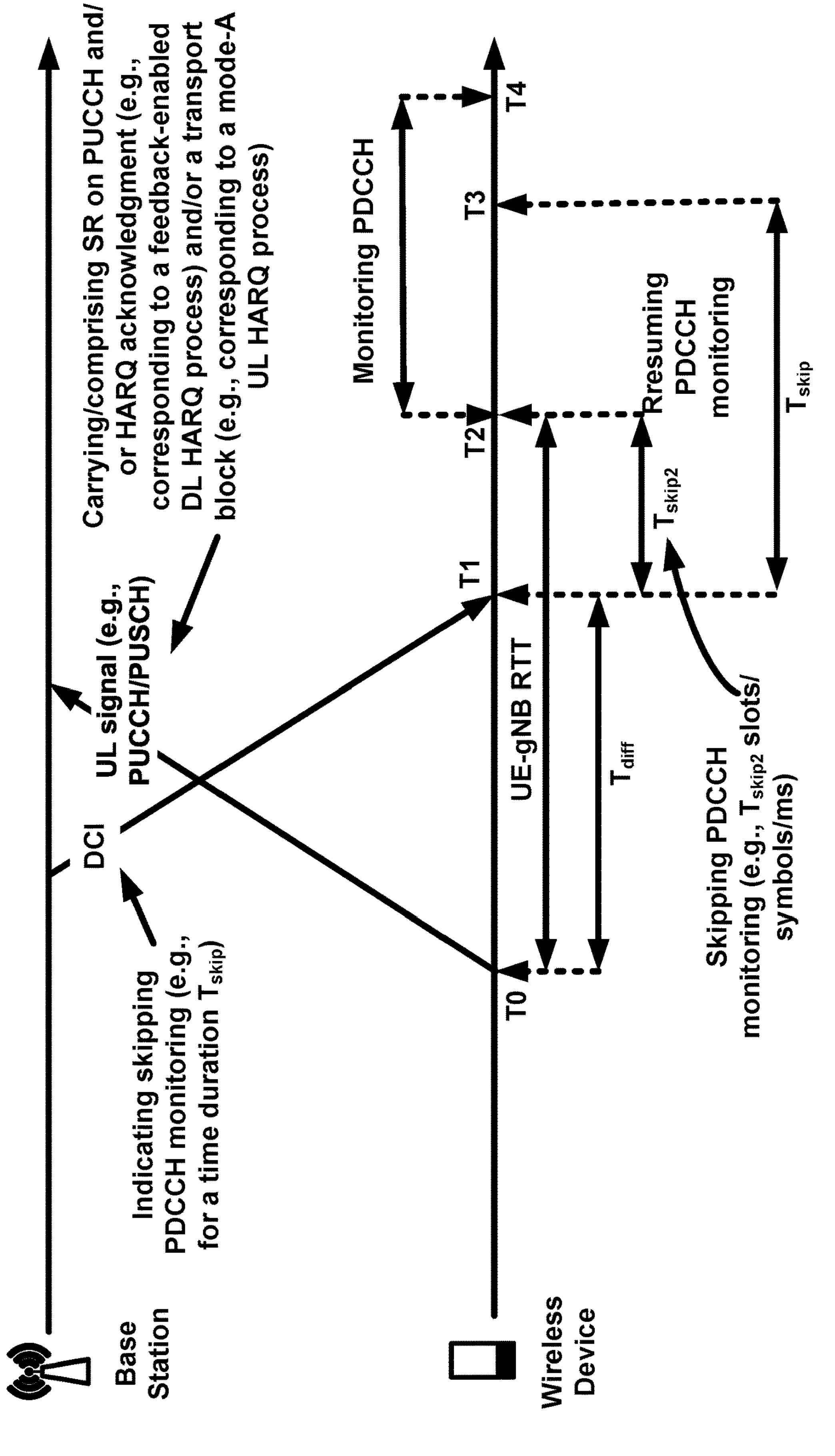
FIG. 23 shows an example of a PDCCH monitoring procedure in wireless communications systems.

FIG. 23 shows an example of a PDCCH monitoring procedure in wireless communications systems per an aspect of the present disclosure. The example method of the FIG. 22 may be used by a wireless device for determining whether to skip the PDCCH monitoring or not. The wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

A wireless device may receive, from the base station, the one or more configuration parameters. The one or more configuration parameters may, for example, comprise the one or more serving cell (e.g., the one or more serving cells or the one or more cells) configuration parameters. The one or more configuration parameters may configure the wireless device for multi-cell communication and/or carrier aggregation (CA). The one or more configuration parameters may comprise one or more BWP configuration parameters. The one or more configuration parameters may comprise the one or more PDCCH configuration parameters. The one or more PDCCH configuration parameters may configure the wireless device with the set of durations (e.g., by PDCCHSkippingDurationList) for the PDCCH skipping.

As shown in FIG. 23, a wireless device may send (e.g., transmit) the UL signal/channel (e.g., a PUCCH providing/carrying the positive SR) at time/occasion TO (e.g., to the base station). The time/occasion TO may correspond to a last/final/ending/latest symbol of the UL signal. The UL signal may take a half of the UE-gNB RTT of the corresponding serving cell to reach the base station. As shown in FIG. 23, prior to receiving the UL signal at the base station, the base station may send (e.g., transmit) the DCI indicating the PDCCH skipping to the wireless device (e.g., at the time/occasion of sending/transmitting the DCI, the base station may not be aware of the transmission on the UL signal at the wireless device). For example, the wireless device may, at a first offset (e.g. $T_{diff}$ slots/symbols/ms) after the transmission time/occasion of the UL signal, receive the DCI at time/occasion/interval T1 in FIG. 23. As shown in FIG. 23, the first offset (e.g. $T_{diff}$ slots/symbols/ms) may be smaller than the UE-gNB RTT of the serving cell.

As shown in FIG. 23, a wireless device may receive (e.g., from the base station on a DL (active) BWP of the serving cell) a DCI at time/occasion/interval T1 (e.g., the first offset after the transmission time/occasion of the UL signal). For example, the time/occasion/interval T1 in FIG. 23 may indicate a last/final/ending/latest symbol of a reception time/ occasion/resource of the DCI. The DCI may indicate skipping PDCCH (e.g., skipping/stopping/avoiding monitoring PDCCH or skipping/stopping/avoiding monitoring control channels, and/or skipping/stopping/avoiding monitoring PDCCH candidates) within/during/for a time window/duration (e.g., $T_{skip}$ slots/symbols/milliseconds) on the DL BWP of the serving cell. The wireless device may determine the time window (or the time value) from the 'PDCCH monitoring adaptation indication' field of the DCI and/or the one or more configuration parameters (e.g., PDCCHSkipping-DurationList).

Based on (e.g., in response to) the receiving the DCI after the first offset from the transmission of the UL signal, a wireless device may determine a first time duration (e.g., $T_{skip2}$ slots/symbols/milliseconds) for skipping the PDCCH monitoring. The wireless device may determine the first time duration (e.g., $T_{skip2}$ slots/symbols/milliseconds) based on the wireless device-base station RTT of the serving cell and the time window/duration (e.g., $T_{skip}$ slots/symbols/milliseconds). As shown in FIG. 23, the wireless device may determine the first time duration as a minimum of the time duration and a second time duration. The wireless device may determine the second time duration as a subtraction of the first offset from the wireless device-base station RTT of the serving cell (e.g., UE-gNB RTT-$T_{diff}$). In the example of FIG. 23, the wireless device may determine the first time duration as $T_{skip2}$=min($T_{skip}$, UE-gNB RTT-$T_{diff}$) slots/symbols/milliseconds. The wireless device may resume monitoring the PDCCH the wireless device-base station RTT after the transmission time/occasion of the UL signal (e.g., for monitoring the PDCCH during T2 to T3 in FIG. 23).

One or more configuration parameters may comprise the one or more DRX configuration parameters (e.g., corresponding to a serving cell of the one or more serving cells). The wireless device may transit/switch to the DRX active time of the DRX operation the UE-gNB RTT of the serving cell after the transmission time/occasion of the UL signal if the DRX operation of the serving cell is configured (e.g., via the one or more DRX configuration parameters). The wireless device may resume monitoring the PDCCH in response to the switching/transiting to the DRX active time of the DRX operation.

Examples described herein may allow the wireless device properly determining whether to skip the PDCCH monitoring or resume the PDCCH monitoring (e.g., based on/in response to the transmission of the UL signal). Some example embodiments may improve the battery life of the wireless device by reducing consumed power of the wireless device (e.g., reducing consumed power for the PDCCH monitoring). By not unnecessarily resuming the PDCCH monitoring on the DL active BWP of the serving cell (e.g., when the serving cell is part of the NTN), the wireless device may reduce consumed power for the PDCCH monitoring.

Figure 24:
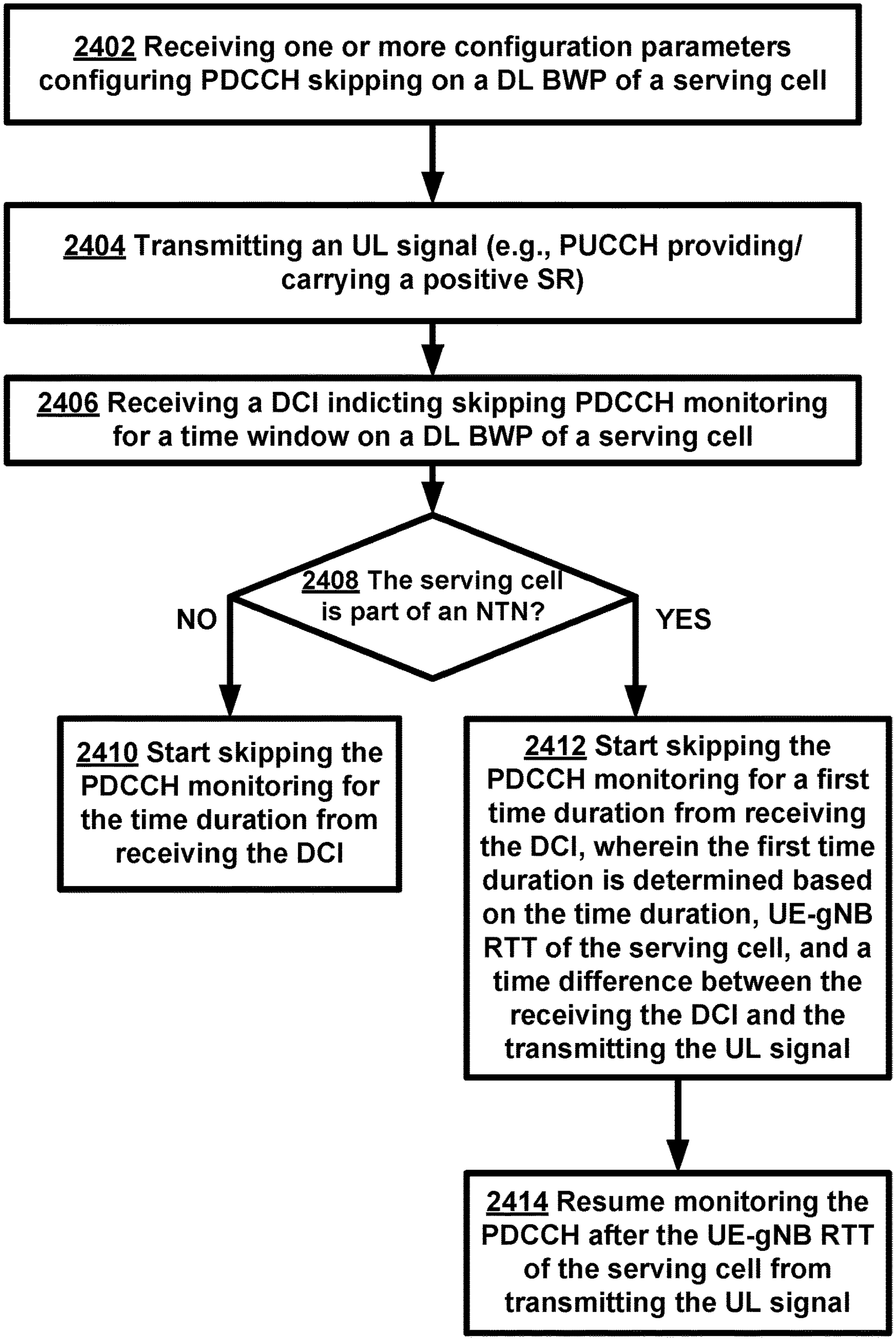
FIG. 24 shows a flowchart of an example method for improving the PDCCH monitoring in wireless communication systems.

FIG. 24 shows a flowchart of an example method for improving the PDCCH monitoring in wireless communication systems. The example method of the FIG. 24 may be used by a wireless device for determining whether to skip the PDCCH monitoring or not. The wireless device may be in an RRC inactive state/mode (e.g., an RRC_INACTIVE/IDLE state), and/or an RRC idle mode/state (e.g., an RRC_IDLE state), and/or an RRC connected state/mode (e.g., an RRC_CONNECTED state).

As shown in FIG. 24, the wireless device in step 2402 may receive, from the base station, the one or more configuration parameters. The one or more configuration parameters may, for example, comprise the one or more serving cell (e.g., the one or more Serving Cells or the one or more cells) configuration parameters. The one or more configuration parameters may configure the wireless device for multi-cell communication and/or carrier aggregation (CA). The one or more configuration parameters comprise one or more BWP configuration parameters. The one or more configuration parameters may comprise the one or more PDCCH configuration parameters. The one or more PDCCH configuration parameters may configure the wireless device with the set of durations (e.g., by PDCCHSkippingDurationList) for the PDCCH skipping.

As shown in FIG. 24, the wireless device in step 2404 may send (e.g., transmit) the UL signal/channel (e.g., a PUCCH providing/carrying the positive SR). The wireless device in step 2406 may receive (e.g., from the base station on a DL (active) BWP of the serving cell) the DCI at a first offset (e.g., $T_{diff}$ slots/symbols/milliseconds) after the transmission time/occasion of the UL signal. The DCI may indicate skipping PDCCH (e.g., skipping/stopping/avoiding monitoring PDCCH or skipping/stopping/avoiding monitoring control channels, and/or skipping/stopping/avoiding monitoring PDCCH candidates) within/during/for a time window/duration (e.g., $T_{skip}$ slots/symbols/milliseconds) on the DL BWP of the serving cell.

As shown in FIG. 24, the wireless device in step 2408 may, based on (e.g., in response to) the receiving the DCI after the first offset from the transmission of the UL signal and whether the serving cell being part of the NTN or not, determine a first time duration (e.g., $T_{skip2}$ slots/symbols/milliseconds) for skipping the PDCCH monitoring. Based on (e.g., in response to) the serving cell not being part of the NTN (e.g., the serving cell being part of a terrestrial network), the wireless device in step 2410 may skip the PDCCH monitoring for the time duration (e.g., indicated by the PDCCH skipping indication field of the DCI) on the DL BWP of the serving cell starting at the beginning/starting (e.g., first/initial symbol) of the first slot after the reception time/occasion of the DCI. The wireless device may determine the first time duration being equal to the time duration indicated by the PDCCH skipping indication field of the DCI.

Based on (e.g., in response to) the serving cell being part of the NTN (e.g., the serving cell not being part of a terrestrial network), the wireless device in step 2412 may determine the first time duration (e.g., $T_{skip2}$ slots/symbols/milliseconds) based on the UE-gNB RTT of the serving cell and the time window/duration (e.g., $T_{skip}$ slots/symbols/milliseconds) indicated by the DCI. As shown in FIG. 24 and discussed in the embodiment of the FIG. 23, the wireless device may determine the first time duration as the minimum of the time duration and the second time duration (e.g., $T_{skip2}$=min($T_{skip}$, UE-gNB RTT-$T_{diff}$) slots/symbols/milliseconds). For example, the wireless device in step 2414 may resume the PDCCH monitoring associated with the UE-gNB RTT of the serving cell from the transmission of the UL signal (e.g., an expiry of the second time duration).

Examples described herein may allow the wireless device to properly determine whether to skip the PDCCH monitoring or resume the PDCCH monitoring (e.g., in response to the transmission of the UL signal). Some example embodiments may improve the battery life of the wireless device by reducing consumed power of the wireless device (e.g., reducing consumed power for the PDCCH monitoring). By not unnecessarily resuming the PDCCH monitoring on the DL active BWP of the serving cell (e.g., when the serving cell is part of the NTN), the wireless device may reduce consumed power for the PDCCH monitoring.

An example method may comprise: receiving, by a wireless device from a base station via a non-terrestrial network (NTN), one or more configuration parameters indicating: at least one time duration for physical downlink control channel (PDCCH) skipping/monitoring on a bandwidth part; one or more NTN configuration parameters for determining a round-trip transmission delay (RTT) between the wireless device and the base station; receiving a downlink control information (DCI) indicating a PDCCH skipping for a time duration, of the at least one time duration, on the bandwidth part; skipping, during the time duration and in response to the DCI, PDCCH monitoring on the bandwidth part; transmitting, during the time duration, an uplink (UL) signal; and based on/in response to/irrespective of the transmitting the UL signal, keeping skipping the PDCCH monitoring for a first time duration, wherein the first time duration is at most the RTT from a transmission occasion/time of the UL signal. The above-example method may be performed, wherein the UL signal comprises/carries at least one of: a scheduling request (SR) on physical uplink shared channel (PUCCH); a downlink (DL) hybrid automatic repeat request (HARQ) acknowledgement corresponding to a DL HARQ process, wherein the DL HARQ process is not feedback disabled; or a transport block (TB) corresponding to an UL HARQ process, wherein the UL HARQ process has a HARQ mode A. One or more of the above-example methods may be performed, wherein: a start of a SR prohibit timer corresponding to the SR is after the RTT from the transmission time/occasion of the SR; a start of a DL retransmission timer corresponding to the DL HARQ process is after the RTT from the transmission time/occasion of the DL HARQ acknowledgement; and a start of an UL retransmission timer corresponding to the UL HARQ process is after the RTT from the transmission time/occasion of the TB. One or more of the above-example methods may be performed, wherein the DCI schedules a transmission of the TB via the UL signal. One or more of the above-example methods may be performed, wherein a transmission of the TB is via an UL configured grant resource, wherein the one or more configuration parameters indicate the UL configured grant resource. One or more of the above-example methods may be performed, wherein the DCI schedules a transmission of the DL HARQ acknowledgement. One or more of the above-example methods may be performed, wherein a transmission of the DL HARQ acknowledgement corresponds to a DL semi-persistent scheduling (SPS) resource, wherein the one or more configuration parameters indicate the DL SPS resource. One or more of the above-example methods may be performed, wherein the first time duration is based on the time duration and the RTT. One or more of the above-example methods may be performed, wherein the first time duration is a minimum of a second time duration and the RTT, wherein the second time duration is equal to a subtraction of a third time duration from the time duration. One or more of the above-example methods may be performed, wherein the third time duration is a time difference between the transmission occasion/time of the UL signal and a reception occasion/time of the DCI. One or more of the above-example methods may be performed, further comprising avoiding resuming PDCCH monitoring in response to the transmitting the UL signal. One or more of the above-example methods may be performed, further comprising resuming PDCCH monitoring after the RTT from the transmission time/occasion of the UL signal. One or more of the above-example methods may be performed, further comprising: starting, in response to the receiving DCI, a timer with a length equal to the time duration; and in response to the transmitting the UL signal, avoiding stopping the timer while the timer is running. One or more of the above-example methods may be performed, further comprising stopping the timer after the RTT from the transmission occasion/time of the UL signal. One or more of the above-example methods may be performed, further comprising: transmitting a first UL signal; receiving, after the transmitting the first UL signal, a first DCI indicating a first PDCCH skipping for a fourth time duration, of the at least one time duration, on the bandwidth part, wherein the receiving the first DCI is within the RTT from the transmitting the first UL signal; and skipping, during a fifth time duration and in response to the first DCI, the PDCCH monitoring on the bandwidth part, wherein the fifth time duration is based on the RTT and the fourth time duration. One or more of the above-example methods may be performed, wherein the fifth time duration is a minimum of the fourth time duration and a sixth time duration, wherein the sixth time duration is a subtraction of a seventh time duration from the RTT. One or more of the above-example methods may be performed, wherein the seventh time duration is a time difference between a receiving time of the first DCI and a transmission time of the first UL signal. One or more of the above-example methods may be performed, wherein the one or more configuration parameters indicate a discontinuous reception (DRX) operation.

An example method may comprise: receiving, by a wireless device from a base station via a non-terrestrial network, a downlink control information (DCI) indicating a PDCCH skipping for a time duration on a bandwidth part (BWP); starting, in response to the DCI, skipping PDCCH monitoring; transmitting an uplink signal; in response to the transmitting the uplink signal, determining a first time duration based on the time duration and a round trip transmission delay (RTT) between wireless device and the base station; and keeping skipping, during the first time duration from the transmitting the uplink signal, PDCCH monitoring on the BWP.

An example method may comprise: receiving, by a wireless device from a base station via a serving cell, a downlink control information (DCI) indicating a PDCCH skipping for a time duration on a bandwidth part (BWP); starting, in response to the DCI, skipping PDCCH monitoring on the BWP; transmitting an uplink signal; in response to the transmitting the uplink signal and the serving cell being part of a non-terrestrial network, determining a first time duration based on the time duration and a round trip transmission delay (RTT) between wireless device and the base station; and keeping skipping, during the first time duration from the transmitting the uplink signal, PDCCH monitoring on the BWP.

An example method may comprise: receiving, by a wireless device from a base station via a serving cell, a downlink control information (DCI) indicating a PDCCH skipping for a time duration on a bandwidth part (BWP); starting, in response to the DCI, skipping PDCCH monitoring on the BWP; transmitting an uplink signal; and in response to the transmitting the uplink signal and the serving cell not being part of a non-terrestrial network, resuming the PDCCH monitoring on the BWP.

An example method may comprise: transmitting, by a wireless device to a base station, an uplink signal; receiving a downlink control information (DCI) indicating a PDCCH skipping for a time duration on a bandwidth part (BWP); in response to the receiving the DCI and the serving cell being part of a non-terrestrial network, determining a first time duration based on the time duration and a round trip transmission delay (RTT) between wireless device and the base station; and starting, in response to the DCI and the determining, skipping PDCCH monitoring on the BWP during the first time duration.

An example method may comprise: transmitting, by a wireless device to a base station, an uplink signal; receiving a downlink control information (DCI) indicating a PDCCH skipping for a time duration on a bandwidth part (BWP); starting, in response to the receiving the DCI and the serving cell not being part of a non-terrestrial network, skipping PDCCH monitoring on the BWP during the time duration.

An example method may comprise: transmitting, by a base station to a wireless device via a non-terrestrial network (NTN), one or more configuration parameters indicating: at least one time duration for physical downlink control channel (PDCCH) skipping/monitoring on a bandwidth part; one or more NTN configuration parameters for determining a round-trip transmission delay (RTT) between the wireless device and the base station; transmitting a first downlink control information (DCI) indicating a PDCCH skipping for a time duration, of the at least one time duration, on the bandwidth part; receiving, during the time duration from the transmitting the first DCI, an uplink (UL) signal from the wireless device; and in response to the receiving the UL signal, transmitting a second DCI to the wireless device.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, one or more configuration parameters for determination of round-trip transmission delay (RTT) between the wireless device and a base station;

receiving downlink control information (DCI), wherein the DCI indicates skipping physical downlink control channel (PDCCH) monitoring for a first time duration on an active bandwidth part (BWP); and skipping PDCCH monitoring for a second time duration, wherein the second time duration is based on:

an RTT determined for an uplink transmission; and the first time duration.

2. The method of claim 1, further comprising:

transmitting, in the second time duration, the uplink transmission.

3. The method of claim 1, wherein the uplink transmission comprises at least one of:

a scheduling request (SR) on a physical uplink control channel (PUCCH);

a downlink (DL) hybrid automatic repeat request (HARQ) acknowledgement corresponding to a DL HARQ process, wherein the DL HARQ process is not feedback disabled; or a transport block (TB) corresponding to an uplink (UL) HARQ process, wherein the UL HARQ process comprises a HARQ mode A process.

4. The method of claim 3, wherein:

a start of an SR prohibit timer corresponding to the SR is after the determined RTT from a transmission time of the SR;

a start of a DL retransmission timer corresponding to the DL HARQ process is after the determined RTT from a transmission time of the DL HARQ acknowledgement; and a start of an UL retransmission timer corresponding to the UL HARQ process is after the determined RTT from a transmission time of the TB.

5. The method of claim 1, wherein receiving the one or more configuration parameters comprises:

receiving one or more predefined time durations configuring the wireless device to skip the PDCCH monitoring; and wherein receiving the DCI comprises:

receiving the DCI indicating skipping PDCCH monitoring for the first time duration of the one or more predefined time durations.

6. The method of claim 1, further comprising:

transmitting, after the skipping the PDCCH monitoring, the uplink transmission.

7. The method of claim 1, wherein the second time duration is a minimum value of:

a subtraction of a third time duration from the first time duration; and the determined RTT.

8. The method of claim 7, wherein the third time duration corresponds to a time difference between a transmission time of the uplink transmission and a reception time of the DCI.

9. The method of claim 1, further comprising:

starting, based on the received DCI, a timer with a length equal to the first time duration; and after transmitting the uplink transmission, continuing the timer to run without stopping until an expiration.

10. The method of claim 9, further comprising:

stopping the timer after the determined RTT from a transmission time of the uplink transmission.

11. The method of claim 1, further comprising:

determining, by the wireless device, based on the one or more configuration parameters, and for the uplink transmission, the RTT; and transmitting the uplink transmission.

12. The method of claim 1, wherein the skipping PDCCH monitoring comprises:

starting, based on the received DCI, a timer associated with a discontinuous reception (DRX) operation; and wherein the method further comprises:

resuming, based on an expiration of the timer associated with the DRX operation, the PDCCH monitoring.

13. A method comprising:

sending, by a wireless device to a base station via a serving cell, an uplink (UL) transmission;

receiving, after the sending the UL transmission, downlink control information (DCI), wherein:

the DCI indicates skipping physical downlink control channel (PDCCH) monitoring for a first time duration on an active bandwidth part (BWP); and a time of receiving the DCI is within a round-trip transmission delay (RTT) from the sending the UL transmission; and skipping, based on the DCI, PDCCH monitoring for a second time duration on the active BWP, wherein the second time duration is based on:

the RTT determined for the UL transmission; and the first time duration.

14. The method of claim 13, wherein the second time duration is a minimum value of:

the first time duration; and a subtraction of a third time duration from the RTT.

15. The method of claim 14, wherein the third time duration corresponds to a time difference between a receiving time of the DCI and a transmission time of the UL transmission.

16. The method of claim 13, further comprising:

determining, based on whether the serving cell being part of a non-terrestrial network (NTN), the second time duration, wherein:

the second time duration is determined based on the first time duration if the serving cell is not part of a NTN; or based on the serving cell being part of a NTN, the second time duration is determined based on:

the first time duration;

the RTT from the sending the UL transmission; and a time difference between a receiving time of the DCI and a transmission time of the UL transmission.

17. The method of claim 13, further comprising:

resuming, based on an expiration of the second time duration, the PDCCH monitoring.

18. A method comprising:

sending, by a base station to a wireless device, one or more configuration parameters comprising:

one or more first configuration parameters indicating one or more time durations associated with skipping physical downlink control channel (PDCCH) monitoring on a bandwidth part (BWP); and one or more second configuration parameters for determination of round-trip transmission delay (RTT) between the wireless device and the base station;

sending first downlink control information (DCI), where the first DCI indicates skipping PDCCH monitoring on the BWP for a first time duration of the one or more time durations; and receiving, from the wireless device, an uplink (UL) transmission at a time that is based on:

a time corresponding to the sending the first DCI;

the first time duration; and an RTT determined for an uplink transmission.

19. The method of claim 18, further comprises:

sending, based on the receiving the UL transmission, second DCI to the wireless device.

* * * * *